US010252577B2

(12) United States Patent
Akashi et al.

(10) Patent No.: US 10,252,577 B2
(45) Date of Patent: Apr. 9, 2019

(54) PNEUMATIC TIRE

(71) Applicant: The Yokohama Rubber Co., LTD., Minato-ku, Tokyo (JP)

(72) Inventors: Yasutaka Akashi, Hiratsuka (JP); Takahiro Yamakawa, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 630 days.

(21) Appl. No.: 14/586,718

(22) Filed: Dec. 30, 2014

(65) Prior Publication Data

US 2015/0202928 A1    Jul. 23, 2015

Related U.S. Application Data

(63) Continuation-in-part of application No. PCT/JP2013/080658, filed on Nov. 13, 2013.

(30) Foreign Application Priority Data

Nov. 15, 2012 (JP) .................................. 2012-251000
Apr. 30, 2014 (JP) .................................. 2014-093297

(51) Int. Cl.
*B60C 11/03* (2006.01)
*B60C 11/13* (2006.01)
*B60C 11/12* (2006.01)

(52) U.S. Cl.
CPC ...... *B60C 11/0306* (2013.01); *B60C 11/1218* (2013.01); *B60C 11/1236* (2013.01);
(Continued)

(58) Field of Classification Search
CPC ............. B60C 11/0306; B60C 11/1218; B60C 11/1236; B60C 11/1392
See application file for complete search history.

(56) References Cited

U.S. PATENT DOCUMENTS 6,405,772 B1 *   6/2002  Suzuki ..................... B60C 11/11
                                             152/209.15
2002/0139460 A1 * 10/2002 Boiocchi ............. B60C 11/0302
                                             152/209.2
(Continued)

FOREIGN PATENT DOCUMENTS

EP            0 773 117        5/1997
JP        2000225814 A   *  8/2000
(Continued)

*Primary Examiner* — Jacob T Minskey
*Assistant Examiner* — Melody Tsui
(74) *Attorney, Agent, or Firm* — Thorpe North & Western

(57) ABSTRACT

A tread pattern on a pneumatic tire is provided in regions of two intermediate land portions and has circumferential shallow grooves extending in the tire circumferential direction. An orientation of a groove inclination inclined with respect to a first direction in the tire circumferential direction of lug grooves provided in a region of one intermediate land portion, is the same as an orientation of a groove inclination inclined with respect to a second direction opposite to of the first direction of the tire circumferential direction of lug grooves provided in a region of another intermediate land portion, and the lug grooves provided in the respective regions of the intermediate land portions are bent so that the groove inclination approaches the tire circumferential direction at positions of intersection with the circumferential shallow grooves.

11 Claims, 9 Drawing Sheets

(52) U.S. Cl.
CPC ... *B60C 11/1392* (2013.01); *B60C 2011/0348* (2013.01); *B60C 2011/0395* (2013.01); *B60C 2011/1209* (2013.01); *B60C 2011/1213* (2013.01)

(56) References Cited

U.S. PATENT DOCUMENTS

| | | | | |
|---|---|---|---|---|
| 2009/0229721 | A1* | 9/2009 | Ikeda | B60C 11/0306 |
| | | | | 152/209.18 |
| 2010/0186861 | A1 | 7/2010 | Ishiguro et al. | |
| 2010/0326577 | A1 | 12/2010 | Iwai | |
| 2011/0041973 | A1* | 2/2011 | Numata | B60C 11/0306 |
| | | | | 152/209.18 |
| 2011/0056601 | A1* | 3/2011 | Ebiko | B60C 9/09 |
| | | | | 152/209.16 |
| 2012/0285592 | A1* | 11/2012 | Kameda | B60C 11/1392 |
| | | | | 152/209.8 |

FOREIGN PATENT DOCUMENTS

| | | | |
|---|---|---|---|
| JP | 2000225814 A * | 8/2000 | |
| JP | 2009-214775 | 9/2009 | |
| JP | 2010168006 | 8/2010 | |
| WO | WO 2009/034791 | 3/2009 | |

* cited by examiner

PNEUMATIC TIRE

CROSS REFERENCE TO RELATED APPLICATION

This application is a continuation-in-part of International Application No. PCT/JP2013/08658, filed Nov. 13, 2013.

TECHNICAL FIELD

The present technology relates to a pneumatic tire provided with a tread pattern.

BACKGROUND

A conventional tire is known that is used all year long as an all-season tire and that has four circumferential main grooves, a region of center land portion (inside land portion) partitioned by two inner circumferential main grooves on the inside, and regions of two intermediate land portions partitioned by outer circumferential main grooves and the inner circumferential main grooves (see Japanese Unexamined Patent Application Publication No. 2010-168006A). In the tire in Japanese Unexamined Patent Application Publication No. 2010-168006A, lug grooves are provided in the region of the center land portion (inside land portion) and in the regions of the intermediate land portions, and the lug grooves in the regions of the two intermediate land portions extend in an inclined manner in the same orientation with respect to the tire circumferential direction, and the lug grooves in the region of the center land portion (inside land portion) extend in an inclined manner in a different orientation with respect to the tire circumferential direction than the lug grooves in the regions of the intermediate land portions. Snow performance is maintained while dry performance can be improved in the tire according to Japanese Unexamined Patent Application Publication No. 2010-168006A.

SUMMARY

An all-season tire is desirably provided with a tire performance that can handle various road surface conditions such as dry, wet, or snow-covered road surfaces. However, the tire in Japanese Unexamined Patent Application Publication No. 2010-168006A does not exhibit a sufficient balance in abrasion resistance on dry road surfaces, wet performance, and snow performance. Specifically, abrasion resistance on dry road surfaces decreases when wet turning performance and steering stability on snow are improved.

The present technology provides a pneumatic tire having an excellent balance in abrasion resistance on dry road surfaces, wet turning performance, and steering stability on snow.

One aspect of the present technology is a pneumatic tire. The pneumatic tire includes the following embodiments.

Embodiment 1

The embodiment 1 of the pneumatic tire includes: a bead; a side wall; a belt layer; a carcass layer; and a tread portion having a tread pattern.

The tread pattern includes a circumferential main groove group having four circumferential main grooves extending parallel to the tire circumferential direction, the four circumferential main grooves including two outer circumferential main grooves and two inner circumferential main grooves interposed by the outer circumferential main grooves with a tire center line passing between the inner circumferential main grooves.

The tread pattern further includes a plurality of lug grooves transecting a region of a center land portion partitioned by the two inner circumferential main grooves and through which the tire center line passes, and regions of two intermediate land portions partitioned by the outer circumferential main grooves and the inner circumferential main grooves, to form a plurality of land portion blocks in the center land portion and in the intermediate land portions.

The tread pattern further includes circumferential shallow grooves that are provided in the respective regions of the intermediate land portions, that extend in the tire circumferential direction, and that have a groove depth that is less than a groove depth of the circumferential main grooves.

An orientation of a groove inclination that is inclined with respect to a first direction of the tire circumferential direction of first lug grooves provided in a region of a first intermediate land portion of the two intermediate land portions and advancing from the outer side in the tire width direction to the inner side in the tire width direction, is identical to an orientation of a groove inclination that is inclined with respect to a second direction that is opposite to the first direction of the tire circumferential direction of second lug grooves provided in a region of a second intermediate land portion that is different from the first intermediate land portion of the two intermediate land portions and advancing from the outer side in the tire width direction to the inner side in the tire width direction. The lug grooves provided in the respective regions of the intermediate land portions have a curved portion that is curved so that the groove inclination approaches the tire circumferential direction at a position of intersection with the circumferential shallow groove.

The lug grooves that are provided in the center land portion and that advance from the outer side in the tire width direction to the inner side in the tire width direction extend in an orientation of a groove inclination that is different with respect to the tire circumferential direction from the lug grooves provided in the respective regions of the intermediate land portions.

Embodiment 2

In the embodiment 1, the respective regions of the intermediate land portions preferably have sipes that extend so as to be parallel to the lug grooves provided in the respective regions of the intermediate land portions, and the sipes are blocked within the intermediate land portions without connecting with the inner circumferential main grooves.

Embodiment 3

In the embodiment 2, the sipes preferably extend in a zigzag manner while deflecting in a direction orthogonal to the extension direction of the sipes in a region on the inner side of the circumferential shallow grooves in the tire width direction, and extend in a zigzag manner in a sipe depth direction of the sipes from a tread surface toward a bottom portion of the sipes.

Embodiment 4

In the embodiment 2, the sipes preferably extend in a linear manner in a region on the outer side of the circumferential shallow grooves in the tire width direction, and extend in a planar manner in the sipe depth direction of the sipes from the tread surface toward the bottom portion of the sipes.

Embodiment 5

In the embodiment 1, moreover, shoulder land portions are provided in a region on the outer side of the circumferential main groove group in the tire width direction, and regions of the shoulder land portions have shoulder lug grooves, provided therein, extending from the outer side in the tire width direction toward the outer circumferential main grooves, and the shoulder lug grooves are blocked part way through without connecting with the outer circumferential main grooves, whereby the shoulder land portions preferably form continuous land portions that extend continuously in the tire circumferential direction.

Embodiment 6

In the embodiment 1, moreover, shoulder land portions are provided in a region on the outer side of the circumferential main groove group in the tire width direction. Regions of the shoulder land portions have shoulder lug grooves provided therein, extending from the outer side in the tire width direction toward the outer circumferential main grooves. A maximum groove width of the shoulder lug grooves is preferably greater than a maximum groove width of the lug grooves provided in the region of the center land portion and in the regions of the intermediate land portions.

Embodiment 7

In the embodiment 6, the regions of the shoulder land portions have shoulder sipes provided therein, extending from the outer side in the tire width direction toward the outer circumferential main grooves. The shoulder sipes include a first portion that extends in a linear manner in the extension direction of the shoulder sipes and that extends in a planar manner in a sipe depth direction of the shoulder sipes from a tread surface toward a bottom portion of the shoulder sipes, and a second portion that extends in a zigzag manner while deflecting in a direction orthogonal to the extension direction of the shoulder sipes and that extends in a zigzag manner in a sipe depth direction of the shoulder sipes from the tread surface toward the bottom portion of the shoulder sipes, and the shoulder sipes preferably change from the first portion to the second portion while advancing from the outer side in the tire width direction toward the outer circumferential main grooves and then end.

Embodiment 8

In the embodiment 1, portions of edge portions in contact with the circumferential main grooves in the center land portion and the intermediate land portions are preferably provided with a chamfer.

Embodiment 9

In the embodiment 1, a land portion width of the intermediate land portions in a region on the inner side of the circumferential shallow grooves in the tire width direction is preferably greater than a land portion width in a region on the outer side of the circumferential shallow grooves in the tire width direction.

Embodiment 10

In the embodiment 1, a center position in the tire width direction of the circumferential shallow grooves is preferably positioned away from an edge in contact with the intermediate land portion of the inner circumferential main grooves by a distance that is 40% to 60% of the maximum width of the intermediate land portions in the tire width direction.

Embodiment 11

In the embodiment 1, the circumferential shallow grooves preferably divide land portion blocks of the intermediate land portions into inside intermediate land portion blocks positioned on the inner side in the tire width direction and outside intermediate land portion blocks positioned on the outer side in the tire width direction.

A region of the inside intermediate land portion blocks has inside sipes provided therein, extending from the circumferential shallow grooves to the inner side in the tire width direction, and a region of the outside intermediate land portion blocks has outside sipes provided therein, extending from the circumferential shallow grooves to the outer side in the tire width direction.

The inside sipes preferably satisfy extending in a zigzag manner or extending in a direction inclined with respect to the tire radial direction from the tread surface to a tread inside portion, and extending in a zigzag manner on the tread surface.

The outside sipes preferably satisfy at least one of extending in a linear manner along the tire radial direction from the tread surface to the tread inside portion, and extending in a linear manner on the tread surface.

Embodiment 12

In the embodiment 11, groove bottoms of the lug grooves in intersecting peripheral regions of the lug grooves that include intersecting portions of the lug grooves that intersect the circumferential shallow grooves preferably form raised bottom portions having a groove depth less than a groove depth of regions spaced away from the intersecting peripheral regions.

The length along the lug grooves of portions that extend from the intersecting portions to the inner side in the tire width direction of the raised bottom portions of the lug grooves is preferably greater than the length along the lug grooves of portions that extend from the intersecting portions to the outer side in the tire width direction of the raised bottom portions.

Embodiment 13

In the embodiment 11, the inside intermediate land portion blocks have acute angle corner portions having a tip formed at an acute angle by the lug grooves and the inner circumferential main grooves at a position where the lug grooves intersect the inner circumferential main grooves, and the width in the tire width direction of the inside intermediate land portion blocks becomes preferably greater toward the acute angle corner portions in the tire circumferential direction.

Embodiment 14

In the embodiment 11, the outside intermediate land portion blocks have obtuse angle corner portions formed at an obtuse angle by the lug grooves and the outer circumferential main grooves at a position where the lug grooves intersect the outer circumferential main grooves within the outside intermediate land portion blocks.

Chamfers that extend from the obtuse angle corner portions in the tire circumferential direction are provided on edges where the outside intermediate land portion blocks come into contact with the outer circumferential main grooves. The width of the chamfers preferably decreases in a gradual manner as the chamfers become spaced further away from the obtuse angle corner portions in the tire circumferential direction. The chamfers preferably end part way through advancing to corner portions on the opposite side of the obtuse angle corner portions among both ends of the edges in the tire circumferential direction.

Embodiment 15

In the embodiment 1, the circumferential shallow grooves preferably divide land portion blocks of the intermediate land portions into inside intermediate land portion blocks positioned on the inner side in the tire width direction and outside intermediate land portion blocks positioned on the outer side in the tire width direction.

The region of the inside intermediate land portion blocks has the inside sipes provided therein, extending from the circumferential shallow grooves to the inner side in the tire width direction, and the region of the outside intermediate land portion blocks has the outside sipes provided therein, extending from the circumferential shallow grooves to the outer side in the tire width direction.

The inside sipes preferably satisfy extending in a linear manner in the tire radial direction from the tread surface to the tread inside portion and extending in a zigzag manner on the tread surface.

The outside sipes preferably satisfy extending in a linear manner in the tire radial direction from the tread surface to the tread inside portion, and extending in a linear manner on the tread surface.

Embodiment 16

In the embodiment 15, the inside intermediate land portion blocks have the acute angle corner portions having a tip formed at an acute angle by the lug grooves and the inner circumferential main grooves at a position where the lug grooves intersect the inner circumferential main grooves, and the width in the tire width direction of the inside intermediate land portion blocks is preferably greater toward the acute angle corner portions in the tire circumferential direction.

Embodiment 17

In the embodiment 15, the outside intermediate land portion blocks have the obtuse angle corner portions formed at an obtuse angle by the lug grooves and the outer circumferential main grooves at a position where the lug grooves intersect the outer circumferential main grooves within the outside intermediate land portion blocks.

The chamfers that extend from the obtuse angle corner portions in the tire circumferential direction are provided on the edges where the outside intermediate land portion blocks come into contact with the outer circumferential main grooves. The width of the chamfers preferably decreases in a gradual manner as the chamfers become spaced further away from the obtuse angle corner portions in the tire circumferential direction. The chamfers preferably end part way through advancing to angle portions on the opposite side of the obtuse angle corner portions among both ends of the edges in the tire circumferential direction.

Embodiment 18

In the embodiment 1, groove bottoms of the lug grooves in intersecting peripheral regions that include intersecting portions of the lug grooves that intersect with the circumferential shallow grooves and regions of the intersecting portions preferably form raised bottom portions that are higher than the groove bottoms of regions spaced away from the intersecting peripheral regions.

The length along the lug grooves of portions that extend from the intersecting portions to the inner side in the tire width direction of the raised bottom portions of the lug grooves is preferably greater than the length along the lug grooves of portions that extend from the intersecting portions to the outer side in the tire width direction of the raised bottom portions.

Embodiment 19

In the embodiment 18, the inside intermediate land portion blocks have acute angle corner portions having a tip formed at an acute angle by the lug grooves and the inner circumferential main grooves at a position where the lug grooves intersect the inner circumferential main grooves, and the width in the tire width direction of the inside intermediate land portion blocks is preferably greater toward the acute angle corner portions in the tire circumferential direction.

Embodiment 20

In the embodiment 18, the outside intermediate land portion blocks have obtuse angle corner portions formed at an obtuse angle by the lug grooves and the outer circumferential main grooves at a position where the lug grooves intersect the outer circumferential main grooves within the outside intermediate land portion blocks. Chamfers that extend from the obtuse angle corner portions in the tire circumferential direction are provided on edges where the outside intermediate land portion blocks come into contact with the outer circumferential main grooves. The width of the chamfers preferably decreases in a gradual manner as the chamfers become spaced further away from the obtuse angle corner portions in the tire circumferential direction. The chamfers preferably end part way through advancing to corner portions on the opposite side of the obtuse angle corner portions at both ends of the edges in the tire circumferential direction.

The tire of the present technology demonstrates an excellent balance of abrasion resistance on dry road surfaces, wet turning performance, and steering stability on snow. That is, abrasion resistance on dry road surfaces is maintained while demonstrating excellent wet turning performance and steering stability on snow.

DETAILED DESCRIPTION

The following is a detailed description of the pneumatic tire according to the present technology.

Figure 1:
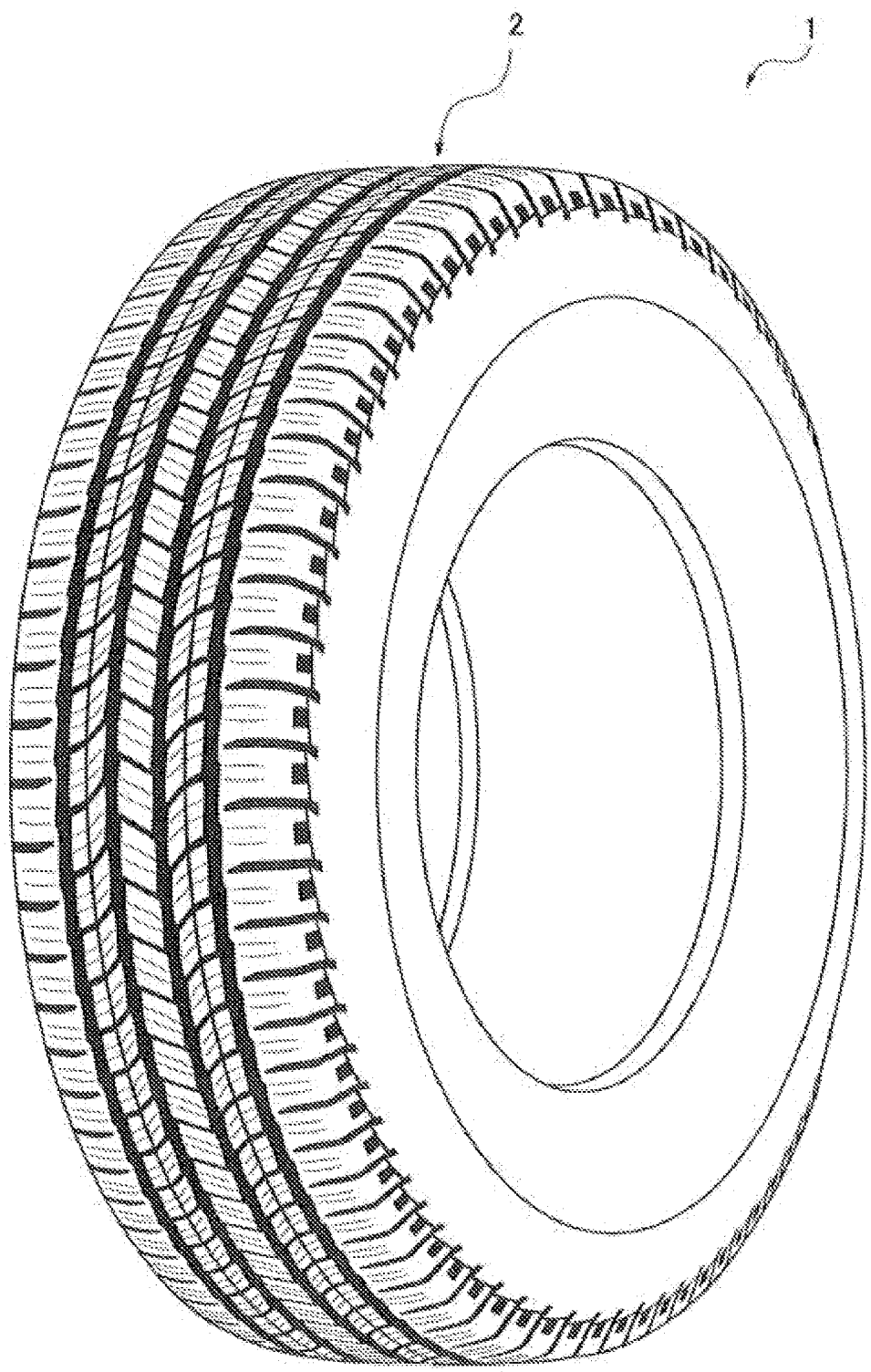
FIG. 1 is a visual appearance view of an entire tire of an embodiment of the present technology.

FIG. 1 illustrates a visual appearance of a pneumatic tire 1 of an embodiment of the present technology.

The pneumatic tire (hereafter referred to as a tire) 1 is a tire for a passenger car.

The structure and rubber members of the tire 1 of the present technology may be either publicly known or novel, and are not particularly limited in the present technology.

Figure 2:
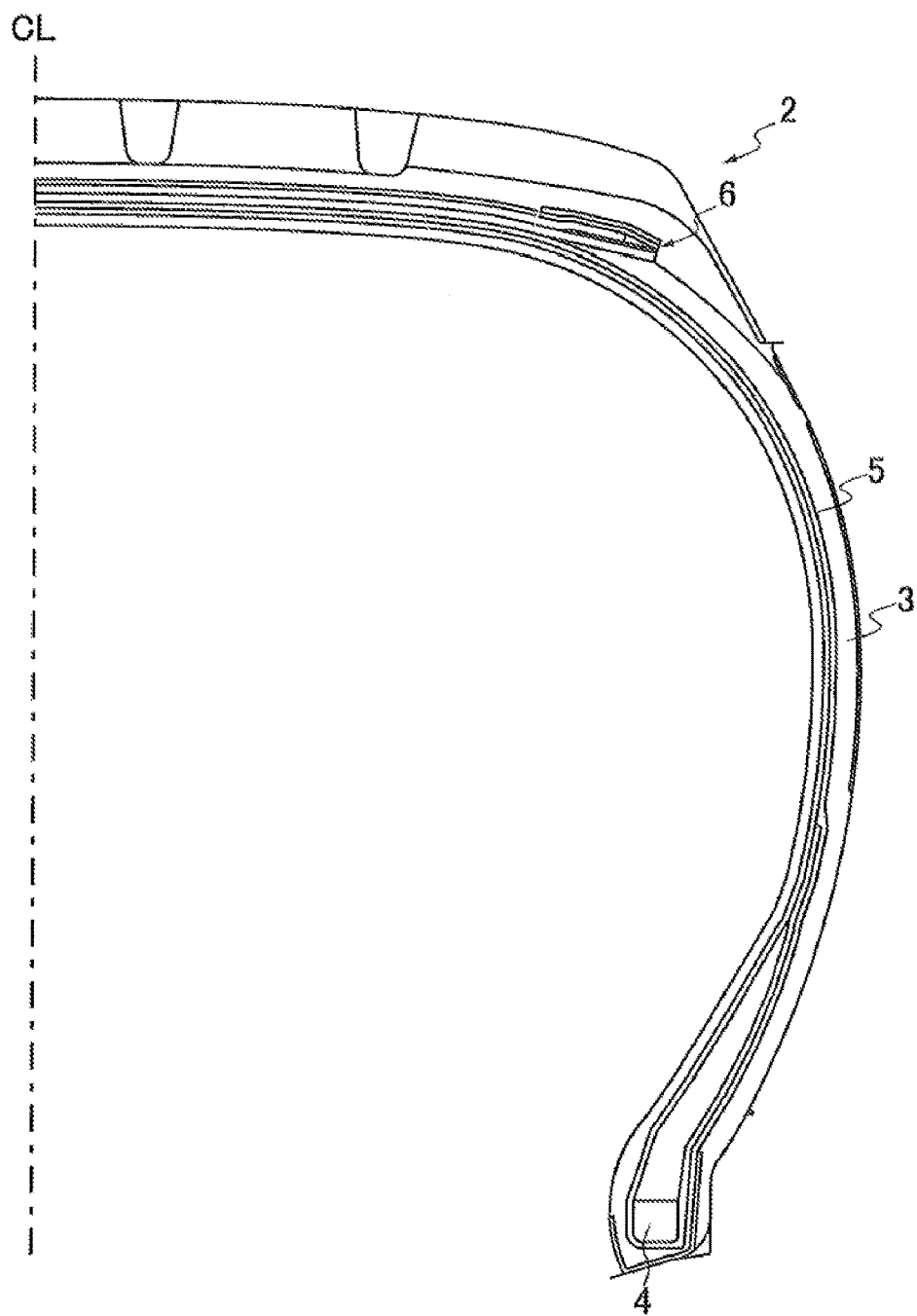
FIG. 2 is a meridian cross-sectional view of a portion of the tire illustrated in FIG. 1.

As illustrated in FIG. 2, the tire 1 includes a tread portion 2, a side wall 3, a bead 4, a carcass layer 5, and a belt layer 6. FIG. 2 is a meridian cross-sectional view illustrating a portion of the tire 1. In addition, the tire 1 includes an inner liner layer, and the like, that are not illustrated in the drawings. The side wall 3 and the bead 4 are each formed as pairs that are arranged on both sides in the tire width direction so as to sandwich the tread portion 2.

The tread portion 2, the bead 4, the belt layer 6, the inner liner, and the like may be either publicly known or novel, and are not particularly limited in the present technology.

Figure 3:
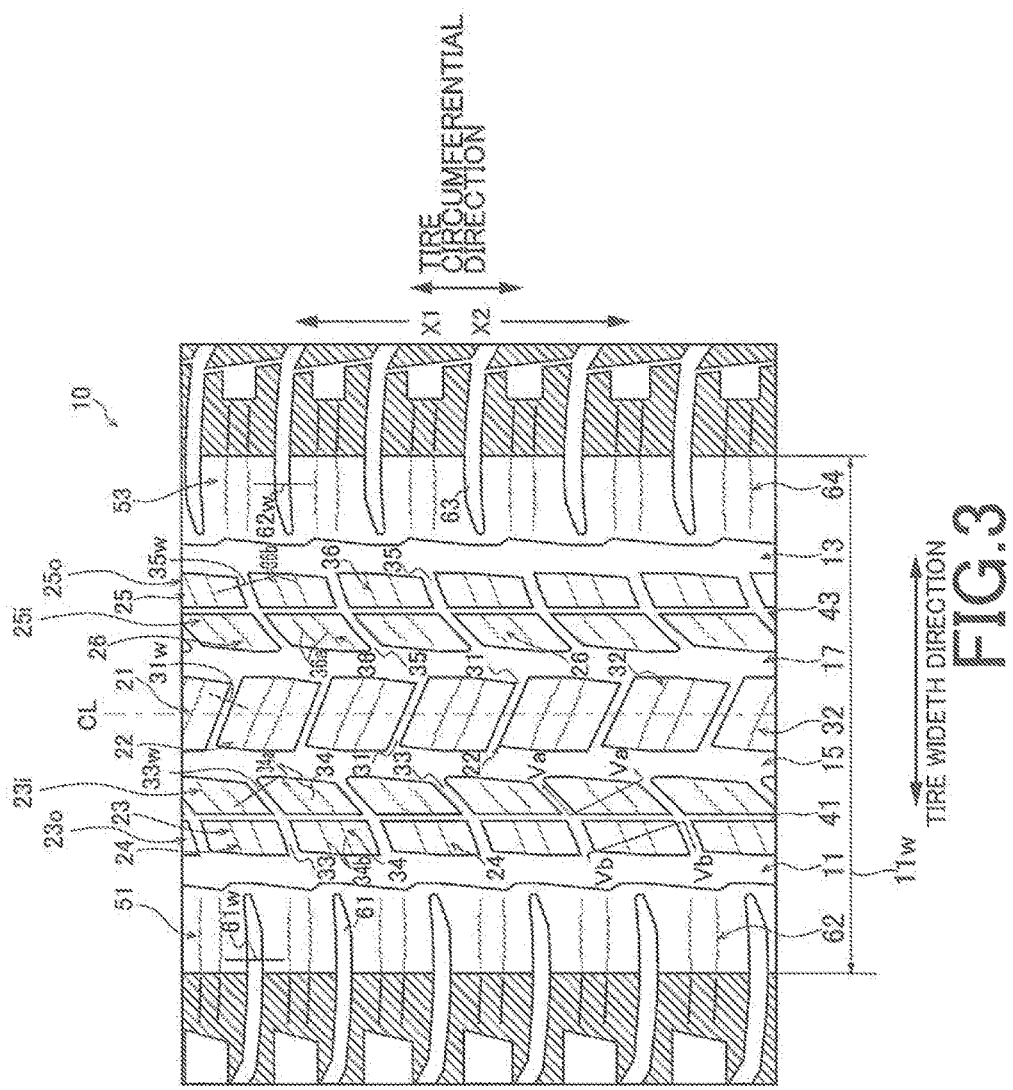
FIG. 3 is a view as seen in plan development view to allow for easy understanding of a tread pattern of the tire of the embodiment.

The tire 1 of the present technology has a tread pattern 10 formed in the tread portion as illustrated in FIG. 3. FIG. 3 is a view as seen in plan development view to allow for easy understanding of the tread pattern 10 of the tire 1 of the present technology. The tire 1 having the tread pattern 10 may be suitably used as a tire for a passenger car. The dimensions of circumferential main grooves, lug grooves, sipes, ground contact widths, chamfers, circumferential shallow grooves, shoulder lug grooves, and land portion blocks which are explained below are numerical examples for a tire for a passenger car.

A tire mounting orientation when mounting a tire to the vehicle for facing one of the sides of the tire outward from the vehicle is predetermined for the tire 1 of the present technology. The reference numeral CL in FIG. 3 refers to a tire center line (tire equatorial line). While the tire 1 is mounted so that the region of the tread pattern 10 on the left side of the tire equatorial line CL in FIG. 3 is located inward to a vehicle, and the region of the tread pattern 10 on the right side of the tire equatorial line CL in FIG. 3 is located outward from the vehicle, the tire may be mounted so that the regions are located inward to and outward from the vehicle in the reverse manner.

While the tire 1 is mounted on a vehicle, the tread pattern 10 comes into contact with the road surface in a region in the tire width direction indicated by a ground contact width 11$w$. Note that the hatched regions in the tread pattern 10 are regions further outside in the tire width direction than ground contact edges.

The ground contact edges are determined as described below. The ground contact edges are end portions in the tire width direction of a ground contact patch when the tire 1 is brought into contact with a horizontal surface under conditions in which the tire 1 is fitted to a regular rim and inflated to a regular inner pressure of 180 kPa, and a load to be applied is set to 88% of a regular load. Herein, "regular rim" includes a "standard rim" defined by the Japan Automobile Tyre Manufacturers Association Inc. (JATMA), a "design rim" defined by the Tire and Rim Association, Inc. (TRA), and a "measuring rim" defined by the European Tyre and Rim Technical Organisation (ETRTO). While "regular inner pressure" includes "maximum air pressure" defined by JATMA, the maximum value in "tire load limits at various cold inflation pressures" defined by TRA, and "inflation pressures" defined by ETRTO, the regular inner pressure is set to 180 kPa when the tire is for a passenger car. Note that "regular load" includes "maximum load resistance" defined by JATMA, the maximum value in "tire load limits at various cold inflation pressures" defined by TRA, and "load capacity" defined by ETRTO.

The tire width direction in the present technology refers to an extension direction of the rotational center axis of the tire 1, and the tire circumferential direction refers to a rotation direction of the rotation surface of the tread surface, the rotation surface being formed when the tire 1 rotates around the tire rotational center axis. The outer side in the tire width direction refers to a side spaced away more from the tire center line CL in the tire width direction with respect to the position of a certain relative object, and the inner side in the tire width direction refers to a side closer to the tire center line CL in the tire width direction with respect to the position of a certain relative object. The above directions are expressed in FIG. 3. The tire rotation direction of the tread pattern 10 of the present technology is not particularly limited.

The tire 1 of the present technology may have a pitch with the same dimensions as the tread pattern 10 arranged in the tire circumferential direction, or the tire 1 may have a plurality of types of pitches with different dimensions from the tread pattern 10 arranged in the tire circumferential direction to allow for a pitch variation.

The tread pattern 10 is provided with a circumferential main groove group including four circumferential main grooves 11, 13, 15, 17 parallel to the tire circumferential direction, lug grooves 31, 33, 35, and circumferential shallow grooves 41, 43.

(Circumferential Main Groove Group)

The circumferential main groove group includes two outer circumferential main grooves 11, 13 and two inner circumferential main grooves 15, 17. The outer circumferential main grooves 11, 13 are disposed on the outer side of the inner circumferential main grooves 15, 17 in the tire width direction. The two inner circumferential main grooves 15, 17 are disposed so as to be interposed between the outer circumferential main grooves 11, 13. The tire center line CL runs between the inner circumferential main groove 15 and the inner circumferential main groove 17 in the tire width direction. The groove depths of the outer circumferential main grooves 11, 13 and the inner circumferential main grooves 15, 17 are the same each other, but may be different in another embodiment. The total amount of the groove widths of the outer circumferential main grooves 11, 13 and the inner circumferential main grooves 15, 17 is preferably from 15 to 25% of the ground contact width 11$w$ from the point of view of wet performance.

(Lug Grooves)

The lug grooves 31, 33, 35 are grooves that cross the region of a center land portion (inside land portion) 21 and the region of intermediate land portions 23, 25. Each of the lug grooves 31, 33, 35 has a plurality of grooves spaced with intervals in the tire circumferential direction. The lug grooves 31, 33, 35 may each extend in a substantially straight line or may extend in a moderately curved manner. Groove widths 31$w$, 33$w$, 35$w$ of the respective lug grooves 31, 33, 35 are all the same in the tire width direction and are, for example, from 2 to 7 mm.

Now, the center land portion 21 and the intermediate land portions 23, 25 are explained.

Figure 4:
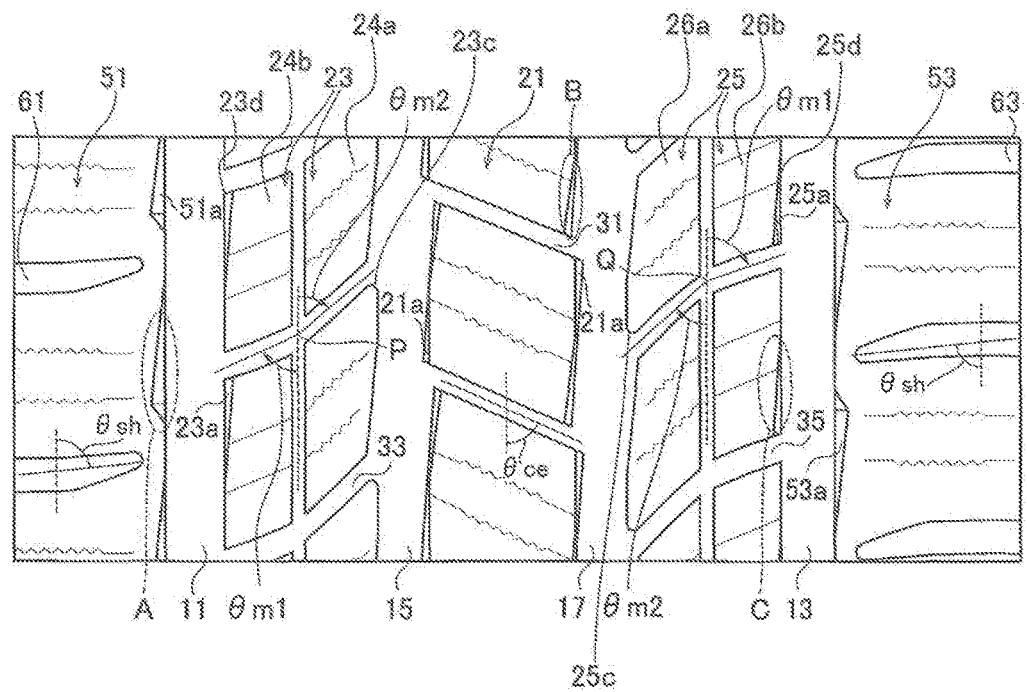
FIG. 4 is an enlarged view focusing on a center land portion and intermediate land portions in the tread pattern illustrated in FIG. 3.

The center land portion 21 is a portion formed by being partitioned by the two inner circumferential main grooves 15, 17. The tire center line CL passes through the region of the center land portion 21. A plurality of land portion blocks 22 is formed by the lug grooves 31 in the tire circumferential direction in the region of the center land portion 21. The lug grooves 31 extend in an inclined manner at an inclination angle θce with respect to an X2 direction of the tire circumferential direction as illustrated in FIG. 4. FIG. 4 is an enlarged view of a portion of the tread pattern 10. The inclination angle θce is, for example, from 60° to 85°. Due to the lug grooves 31 having the inclination angle closer to the tire width direction than the tire circumferential direction in this way, a high block rigidity of the land portion blocks 22 can be achieved, and wet turning performance and steering stability on snow can be improved with a small steering angle while the vehicle is traveling. Note that when the lug grooves 31 extend in a moderately curved manner, the inclination angle θce represents an inclination with respect to the X2 direction of a straight line connecting two center points at center positions in the width direction of the lug groove 31 in respective portions connecting the inner circumferential main groove 15 and the outer circumferential main groove 17.

The intermediate land portion 23 is a portion formed by being partitioned by the outer circumferential main groove 11 and the inner circumferential main groove 15. A plurality of land portion blocks 24 is formed in the tire circumferential direction in the region of the intermediate land portion 23 by the lug grooves 33. Furthermore, the intermediate land portion 25 is a portion formed between the outer circumferential main groove 13 and the inner circumferential main groove 17 by being partitioned by the outer circumferential main groove 13 and the inner circumferential main groove 17. A plurality of land portion blocks 26 is formed in the tire circumferential direction in the region of the intermediate land portion 25 by the lug grooves 35.

When the lug grooves 33 and the lug grooves 35 advance from the outer side in the tire width direction to the inner side, an orientation of a groove inclination inclined with respect to an X1 direction (a first direction of the tire circumferential direction) of the lug grooves 33 is the same as an orientation of a groove inclination inclined with respect to an X2 direction (a second direction that is the opposite direction of the first direction of the tire circumferential direction) of the lug grooves 35. In other words, the lug grooves 33 and the lug grooves 35 are inclined in the same orientation with respect to the X1 direction and the X2 direction of the tire circumferential direction. Note that the orientation of a groove inclination expresses a distinction between whether the groove inclination is inclined in a range of 90° to 0° or in a range of 0° to 90° within a range of −90° (90° in the counterclockwise direction) to 90° (90° in the clockwise direction) with respect to the X1 direction or the X2 direction of the tire circumferential direction, and grooves inclined in the same range exhibit the same orientation of the groove inclination, and grooves inclined in different angle ranges exhibit different orientations of the groove inclination.

Conversely, the inclining orientation of the lug grooves 31 with respect to the tire width direction when the lug grooves 31 cross the region of the center land portion 21 from the outer side in the tire width direction to the inner side in the tire width direction, and the inclining orientation of the lug grooves 33, 35 with respect to the tire width direction when the lug grooves 33, 35 cross the regions of the intermediate land portions 23, 25 from the outer side in the tire width direction to the inner side, are opposite to each other with the orientation of the tire width direction as a boundary. Maneuverability when turning left or right is assured by the above inclining orientations of the grooves.

The lug grooves 33 are bent so that the groove inclination approaches the tire circumferential direction at a position P (see FIG. 4) where the lug grooves 33 intersect the circumferential shallow groove 41 part way through the extension of the lug grooves 33 from the outer side in the tire width direction to the inner side in the tire width direction. Specifically, as illustrated in FIG. 4, the lug grooves 33 are inclined at an inclination angle θm1 with respect to the X2 direction on the outer side of the position P in the tire width direction and are inclined at an inclination angle θm2 with respect to the X1 direction on the inner side of the position P in the tire width direction. The inclination angle θm2 is less than the inclination angle θm1. As a result, while the lug grooves 33 advance from the outer side in the tire width direction to the inner side in the tire width direction, the lug grooves 33 are bent so that the groove inclination approaches the tire circumferential direction (X1 direction) while being oriented in the same direction as the tire circumferential direction (X1 direction) in the region on the outer side of the circumferential shallow groove 41 in the tire width direction and in the region on the inner side in the tire width direction. The inclination angle θm1 of the groove inclination is, for example, from 60° to 85°. The inclination angle θm2 is, for example, from 30° to 50°. Due to the lug grooves 33 having two types of inclination angles in this way, when turning with a low steering angle to an intermediate steering angle while the vehicle is traveling on dry road surfaces, wet road surfaces, and snow-covered road surfaces, excellent turning and stability can be achieved. Note that the inclination angle θm1 refers to an inclination with respect to the tire circumferential direction of a straight line connecting two center points at center positions in the groove width direction of the lug grooves 33 in respective portions where the lug grooves 33 connect to the outer circumferential main groove 11 and the circumferential shallow groove 41 when the inner portion with respect to the circumferential shallow groove 41 of the lug grooves 33 extends in a moderately curved manner. Furthermore, the inclination angle θm2 when the lug grooves 33 extend in a moderately curved manner refers to an inclination with respect to the tire circumferential direction of a straight line connecting two center points at center positions in the groove width direction of the lug grooves 33 in respective portions where the lug grooves 33 connect to the inner circumferential main groove 15 and the circumferential shallow groove 41.

When the lug grooves 35 advance from the outer side in the tire width direction to the inner side in the tire width direction, the lug grooves 35 are bent so that the groove inclination approaches the tire circumferential direction (X2 direction) at a position Q (see FIG. 4) where the lug grooves 35 intersect the circumferential shallow groove 43 while being oriented in the same direction as the tire circumferential direction (X2 direction) in the region on the inner side of the circumferential shallow groove 43 in the tire width direction and in the region on the outer side in the tire width direction. Specifically, as illustrated in FIG. 4, the lug grooves 35 are inclined at the inclination angle θm1 with respect to the X1 direction on the outer side of the position Q in the tire width direction and are inclined at the inclination angle θm2 with respect to the X2 direction on the inner side of the position Q in the tire width direction. Note that when the inner portions with respect to the circumferential shallow groove 43 of the lug grooves 35 extend in a moderately curved manner, the inclination angle θm1 refers to an inclination with respect to the tire circumferential direction of a straight line connecting two center points at center positions in the groove width direction of the lug grooves 35 in respective portions where the lug grooves 35 connect to the outer circumferential main groove 13 and the circumferential shallow groove 43. Furthermore, when the lug grooves 35 extend in a moderately curved manner, the inclination angle θm2 refers to an inclination with respect to the tire circumferential direction of a straight line connecting two center points at center positions in the groove width direction of the lug grooves 35 in respective portions where the lug grooves 35 connect to the inner circumferential main groove 17 and the circumferential shallow groove 43. In another embodiment of the lug grooves 35, the inclination angle on the outer side of the position Q in the tire width direction may be larger than the inclination angle on the inner side of the position Q in the tire width direction, or the inclination angle on the inner side of the position Q in the tire width direction may be smaller than the inclination angle on the outer side of the position Q in the tire width direction.

The region of the intermediate land portion 23 on the inner side of the circumferential shallow groove 41 in the tire width direction is preferably wider in the tire width direction than the region on the outer side of the circumferential shallow groove 41 in the tire width direction from the point of view of assuring high block rigidity. The region of the intermediate land portion 25 on the inner side of the circumferential shallow groove 43 in the tire width direction is preferably wider in the tire width direction than the region in the outer side in the tire width direction of the circumferential shallow groove 43 from the same point of view.

(Circumferential Shallow Grooves)

The circumferential shallow grooves 41, 43 are respectively provided in the intermediate land portions 23, 25 and extend in the tire circumferential direction.

The circumferential shallow grooves 41, 43 have raised bottoms and thus have a shallower groove depth than the circumferential main grooves 11, 13, 15, 17. As a result, block rigidity and abrasion resistance on dry road surfaces of the intermediate land portions 23, 25 can be obtained while improving wet turning performance. The groove depth of the circumferential shallow grooves 41, 43 is preferably within 70%, more preferably from 30% to 50% of the groove depth of the circumferential main grooves 11, 13, 15, 17 from the point of view of assuring abrasion resistance.

Furthermore, the groove width of the circumferential shallow grooves 41, 43 is preferably from 5 to 15% of the length (width) in the tire width direction of the intermediate land portions 23, 25. Note that the length in the tire width direction of the intermediate land portions 23, 25 refers to the maximum length in the tire width direction of the land portion blocks 24, 26 on the tread surface.

Furthermore, the circumferential shallow grooves 41, 43 are preferably provided in positions in the tire width direction which are located 40% or more to less than 50% of the overall length (width) in the tire width direction of each of the intermediate land portions 23, 25 from the edges of the outer side of the intermediate land portions 23, 25 in the tire width direction to the edges on the inner side in the tire width direction due to abrasion resistance. That is, the width of land portions in the regions of the intermediate land portions 23, 25 on the inner side of the circumferential shallow grooves 41, 43 in the tire width direction is preferably greater than the width of land portions in the regions of the intermediate land portions 23, 25 on the outer side of the circumferential shallow grooves 41, 43 in the tire width direction.

In another aspect, the center positions in the tire width direction of the circumferential shallow grooves 41, 43 are preferably positioned away from the edges of the inner circumferential main grooves 15, 17 that come into contact with the intermediate land portions 23, 25 by a distance that is from 40% to 60% of the maximum length in the tire width direction of the intermediate land portions 23, 25, that is, the maximum width of the intermediate land portions 23, 25 from the point of view of improving abrasion resistance, and more preferably, the center positions in the tire width direction of the circumferential shallow grooves 41, 43 are positioned away from the edges of the inner circumferential main grooves 15, 17 that come into contact with the intermediate land portions 23, 25 by a distance that is greater than 50% up to 60% of the maximum width in the tire width direction of the intermediate land portions 23, 25. That is, the width of land portions in the regions of the intermediate land portions 23, 25 on the inner side of the circumferential shallow grooves 41, 43 in the tire width direction is preferably greater than the width of land portions in the regions of the intermediate land portions 23, 25 on the outer side of the circumferential shallow grooves 41, 43 in the tire width direction.

Note that the circumferential shallow grooves are preferably not provided in the region of the center land portion 21 and in the regions of the below-mentioned shoulder land portions 51, 53. The land portions 21, 51, 53 contribute greatly to wet turning performance and steering stability on snow when braking and driving, but both wet turning performance and abrasion resistance on dry road surfaces cannot be achieved when the circumferential shallow grooves are provided in the land portions 21, 51, 53.

(Sipes)

The tread pattern 10 further includes sipes 34, 36. In the present technology, the sipes have a width of less than 1.5 mm and have a groove depth of less than 5 mm. Furthermore, the lug grooves have a groove width of 1.5 mm or more and have a groove depth of 5 mm or more.

The sipes 34, 36 are grooves that extend so as to be parallel to the lug grooves 33, 35 in the respective intermediate land portions 23, 25. The sipes 34, 36 are each provided as two sipes in one land portion block 24, 26. Note that, in another embodiment, the number of the sipes 34, 36 in one land portion block 24, 26 may be one or may be three or more.

Figure 5A:
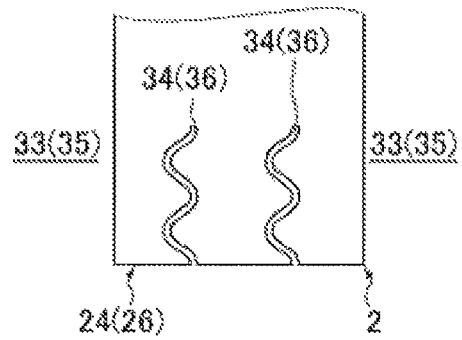
FIG. 5A is a cross-sectional view along the line Va-Va illustrated in FIG. 3 of the tread surface of the tire of the embodiment.
Figure 5B:
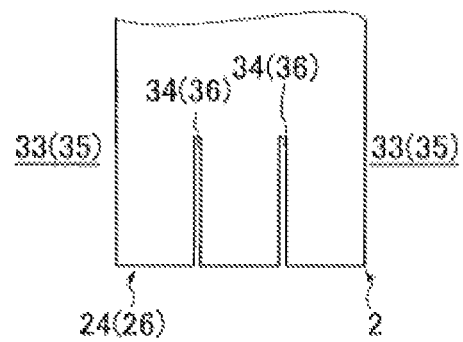
FIG. 5B is a cross-sectional view along the line Vb-Vb illustrated in FIG. 3 of the tread surface of the tire of the embodiment.

The sipes 34, 36 are respectively blocked within the intermediate land portions 23, 25 without connecting with the inner circumferential main grooves 15, 17. As a result, abrasion resistance on dry road surfaces can be improved. The sipes 34, 36 extend in a zigzag manner while deflecting in a direction orthogonal to the extension direction of the sipes 34, 36 in the regions on the inner side of the circumferential shallow grooves 41, 43 in the tire width direction and, as illustrated in FIG. 5A, extend toward the bottom portion in a zigzag manner while deflecting in a direction (left-right direction in drawing in FIGS. 5A to 5C) orthogonal to the sipe depth direction (direction from bottom to top in drawing in FIGS. 5A to 5C) from the tread surface toward the bottom portion. This shape of the sipes 34, 36 in the regions on the inner side in the tire width direction is also referred to hereinbelow as a three-dimensional shape. FIG. 5A is a view of line Va-Va in FIG. 3 and illustrates the state in which the tread portion 2 is in contact with a horizontal plane. Note that the reference numerals represented in parentheses in FIGS. 5A to 5C are for indicating elements in the region of the intermediate land portion 25 for ease of description.

The respective regions on the inner side of the circumferential shallow grooves 41, 43 in the tire width direction in the land portion blocks 24, 26 have an inclination angle with respect to the tire circumferential direction of the lug grooves 33, 35 less than in the regions on the outer side of the circumferential shallow grooves 41, 43 in the tire width direction whereby block rigidity is reduced. As a result, block rigidity when braking and driving is configured to be strengthened due to the above-mentioned three-dimensional shape of the regions of the sipes 34, 36 on the outer side of the circumferential shallow groove 41, 43 in the tire width direction.

The sipes 34, 36 are respectively connected with the outer circumferential main grooves 11, 13. The sipes 34, 36 preferably extend in a linear manner respectively in the regions on the outer side of the circumferential shallow grooves 41, 43 in the tire width direction and, as illustrated in FIG. 5B extend in a planar manner in the sipe depth direction from the tread surface to the bottom portion. This shape of the sipes 34, 36 in the regions of the outer side in the tire width direction is also referred to hereinbelow as a two-dimensional shape. FIG. 5B is a view of line Vb-Vb in FIG. 3 and illustrates the state in which the tread portion 2 is in contact with a horizontal plane. Furthermore, a shape in which the sipes 34, 36 extend in a linear manner does not include a shape in which the sipes 34, 36 extend in a zigzag manner, but includes a shape in which the sipes 34, 36 extend along a straight line and, for example, a shape in which the sipes 34, 36 extend in a moderately curved manner. Consequently, an extension of the sipes 34, 36 in a planar manner includes an extension along a flat plane and, for example, an extension along a moderately curved plane.

Describing the form of the above sipes 34, 36 in further detail, the blocks of the intermediate land portions 23, 25 are grouped into inside intermediate land portion blocks 24a, 26a and outside intermediate land portion blocks 24b, 26b with the circumferential shallow grooves 41, 43 as boundaries. Furthermore, the sipes 34, 36 are also grouped into sipes 34a, 34b, 36a, and 36b (see FIG. 3).

Two sipes 34a are provided in the region of the inside intermediate land portion blocks 24a, extend from the circumferential shallow groove 41 toward the inner circumferential main groove 15, and are blocked within the region of an inside intermediate land portion 23i. Two sipes 34b are provided in the region of the outside intermediate land portion block 24b, extend from the circumferential shallow groove 41 toward the outer circumferential main groove 11, and connect with the outer circumferential main groove 11. Two sipes 36a are provided in the region of the inside intermediate land portion block 26a, extend from the circumferential shallow groove 43 toward the inner circumferential main groove 17, and are blocked within the region of the inside intermediate land block 26a. Two sipes 36b are provided in the region of the outside intermediate land portion 25o, extend from the circumferential shallow groove 43 toward the outer circumferential main groove 13, and connect with the outer circumferential main groove 13. The sipes 34a and the sipes 36a are respectively provided in the inside intermediate land portion blocks 24a, 26a; thus, the sipes 34a and the sipes 36a are inside sipes and are referred to hereinbelow as inside sipes 34a, 36a. The sipes 34b and the sipes 36b are respectively provided in the outside intermediate land portion blocks 24b, 26b; thus, the sipes 34b and the sipes 36b are outside sipes and are referred to hereinbelow as outside sipes 34b, 36b. Note that the number of sipes in each block in the inside intermediate land portion blocks 24a, 26a and the outside intermediate land portion blocks 24b, 26b may be one sipe or three or more sipes.

The inside sipes 34a, 36a respectively extend in a wave-like manner (zigzag manner) while deflecting in a direction orthogonal to the extension direction of the inside sipes 34a, 36a in the regions on the inner side of the circumferential shallow grooves 41, 43 in the tire width direction, and extend toward the bottom portion in a wave-like manner (zigzag manner) while deflecting in a direction orthogonal to the direction from the tread surface toward the bottom portion, that is, in the tire radial direction. That is, the inside sipes 34a, 36a extend in a wave-like manner from the tread surface to a tread inside portion and extend in a wave-like manner on the tread surface.

Conversely, the outside sipes 34b, 36b extend in a linear manner in the tire radial direction from the tread surface to the tread inside portion and extend in a linear manner on the tread surface. That is, the outside sipes 34b, 36b extend in a planar manner from the tread surface to the tread inside portion and on the tread surface.

The reason for the inside sipes 34a, 36a being provided as sipes with a three-dimensional shape in contrast to the outside sipes 34b, 36b is described below. The block rigidity of the inside intermediate land portion blocks 24a, 26a is reduced due to corner portions 23c, 25c (see FIG. 3) having the most acute angle among the corner portions of the intermediate land portion blocks 24, 26 formed by the inner circumferential main grooves 15, 17 and the lug grooves 33, 35 in the inside intermediate land portion blocks 24a, 26a. As a result, in order to suppress any further reduction due to the inside sipes 34a, 36a, sipes having the three-dimensional shape that are able to suppress a reduction in block rigidity further than the outside sipes 34b, 36b are used for the inside sipes 34*a*, 36*a*. That is, the inside intermediate land portion blocks 24*a*, 26*a* on the inner side of the circumferential shallow grooves 41, 43 in the tire width direction in the respective land portion blocks 24, 26 have a smaller inclination angle with respect to the tire circumferential direction of the lug grooves 33, 35 than the outside intermediate land portion blocks 24*b*, 26*b* on the outer side of the circumferential shallow grooves 41, 43 in the tire width direction, and thus, the block rigidity is reduced. As a result, by allowing the inside sipes 34*a*, 36*a* to have the above-mentioned three-dimensional shape, the block rigidity of the inside intermediate land portion blocks 24*a*, 26*a* that influences the wet turning performance and the steering stability on snow is properly maintained. As a result, the block rigidity of the inside intermediate land portion blocks 24*a*, 26*a* is able to approach the block rigidity of the outside intermediate land portion blocks 24*b*, 26*b* and the abrasion resistance can at least be maintained while wet turning performance and steering stability on snow are improved.

The tread pattern 10 further includes sipes 32.

The sipes 32 are grooves that extend so as to be parallel to the lug grooves 31 in the region of the center land portion 21. The sipes 32 are provided as two sipes in one land portion block 22. Note that, in another embodiment, the number of the sipes 32 in one land portion block 22 may be one or may be three or more. The sipes 32 have a three-dimensional shape, thereby strengthening the block rigidity of the center land portion 21 during braking and driving. The sipes 32 connect with the inner circumferential main grooves 15, 17. Note that, in another embodiment, the sipes 32 may have the two-dimensional shape and may be blocked within the center land portion 21 without connecting with the inner circumferential main grooves 15, 17.

(Shoulder Land Portions)

The tread pattern 10 further has a shoulder land portion 51 on the outer side of the outer circumferential main groove 11 in the tire width direction. Furthermore, the tread pattern 10 further has a shoulder land portion 53 on the outer side of the outer circumferential main groove 13 in the tire width direction.

The regions of the shoulder land portions 51, 53 are respectively provided with shoulder lug grooves 61, 63 extending from the outer side in the tire width direction toward the outer circumferential main grooves 11, 13. The shoulder lug grooves 61, 63 are respectively blocked part way through without connecting with the outer circumferential main grooves 11, 13. As a result, the shoulder land portions 51, 53 form continuous land portions that continuously extend in the tire circumferential direction. Since the shoulder land portions 51, 53 contribute greatly to braking performance and turning performance, the formation of such continuous land portions allows a reduction in block rigidity of the shoulder land portions 51, 53 to be suppressed and allows abrasion resistance on dry road surfaces to be improved. Note that the shoulder land portions 51, 53 preferably form the continuous land portions on the sides in contact with the outer circumferential main grooves 11, 13 from the point of view of assuring good wet turning performance and steering stability on snow.

Note that the distance between the shoulder lug groove 61 and the outer circumferential main groove 11 in the region of the shoulder land portion 51, that is, the width of a portion in which two adjacent blocks are joined in the tire circumferential direction to form the continuous land portions (joined width) is preferably from 5% to 20% of the length in the tire width direction between the outer circumferential main groove 11 and the ground contact edge. The length is, for example, 15% in the present embodiment. Similarly, the distance between the shoulder lug groove 63 and the outer circumferential main groove 13 in the region of the shoulder land portion 53 (joined width) is preferably from 5% to 20% of the length in the tire width direction between the outer circumferential main groove 13 and the ground contact edge. The length is, for example, 15% in the present embodiment.

The tips of the shoulder lug grooves 61, 63 on the inner side in the tire width direction are formed in a tapered shape. Maximum groove widths 61*w*, 63*w* of the respective shoulder lug grooves 61, 63 are greater than the groove widths (maximum groove widths) 31*w*, 33*w*, 35*w* of the respective lug grooves 31, 33, 35, and are, for example, from 4 to 8 mm. Thus, wet turning performance and steering stability on snow are improved due to the greater groove width of the shoulder land portions 51, 53 that contribute greatly while braking and driving. Note that the maximum groove width 61*w* of the shoulder lug grooves 61 and the maximum groove width 63*w* of the shoulder lug grooves 63 may be the same or different.

The shoulder lug grooves 61 extend in an inclined manner at θsh (see FIG. 4) with respect to the X1 direction of the tire circumferential direction, for example, at from 75° to 90°. The shoulder lug grooves 63 extend in an inclined manner at θsh (see FIG. 4) with respect to the X2 direction of the tire circumferential direction, for example, at from 75° to 90°. Due to the shoulder lug grooves 61, 63 having inclination angles closer to the tire width direction with respect to the tire circumferential direction in this way, a high block rigidity of the shoulder land portions 51, 53 is assured and wet turning performance and steering stability on snow with a low steering angle is improved. As illustrated in FIG. 4, the inclination angle Ash of the shoulder lug grooves 61, 63 represents an inclination with respect to the tire circumferential direction of a straight line connecting a point at the center position of the width of the shoulder lug grooves 61, 63 in the tire circumferential direction at the ground contact edge and a point at the center position in the tire circumferential direction at an end portion on a side with the outer circumferential main grooves 11, 13. Note that the inclination angles of the shoulder lug grooves 61, 63 may be the same or different.

Furthermore, sipes 62, 64 are respectively provided in the regions of the shoulder land portions 51, 53. Two sipes 62, 64 are provided between two adjacent shoulder lug grooves 61, 63 in the tire circumferential direction. The number of the sipes 62, 64 provided in the shoulder land portions 51, 53 between the two adjacent shoulder lug grooves 61, 63 may be one or may be three or more in another embodiment. Furthermore, the sipes 62, 64 preferably have the three-dimensional shape on the inner side of the ground contact edge in the tire width direction and preferably have the two-dimensional shape on the outer side of the ground contact edge in the tire width direction. The rigidity of the shoulder land portions 51, 53 during braking and driving can be improved due to the sipes 62, 64 having the three-dimensional shape on the inner side of the ground contact edge in the tire width direction.

Alternatively, the sipes 62, 64 include a two-dimensional shape portion (first portion) that extends in a linear manner in the extension direction of the shoulder sipes 62, 64 and extends in planar manner in the sipe depth direction from the tread surface of the sipes 62, 64 to the bottom portion of the sipes 62, 64, and a three-dimensional shape portion (second portion) that extends in a zigzag manner while deflecting in a direction orthogonal to the extension direction of the sipes

62, 64 and extends toward the bottom portion in a zigzag manner while deflecting in a direction orthogonal to the sipe depth direction from the tread surface of the sipes 62, 64 toward the bottom portion of the sipes 62, 64, and the sipes 62, 64 change from the two-dimensional shape portion to the three-dimensional shape portion while advancing from the outer side in the tire width direction toward the outer circumferential main grooves 11, 13 and then end. The rigidity of the shoulder land portions 51, 53 during braking and driving can be improved due to the sipes 62, 64 having the three-dimensional shape on the sides close to the outer circumferential main grooves 11, 13.

(Chamfers)

The tread pattern 10 further has chamfers 21*a*, 23*a*, 25*a*, 51*a*, 53*a*.

As illustrated in FIG. 4, chamfers 21*a* are provided on some of the edge portions of the center land portion 21 in contact with the inner circumferential main grooves 15, 17. As a result, an edge amount of the center land portion 21 is increased, and wet turning performance and steering stability on snow are improved. Conversely, since the chamfers 21*a* are provided on some of the edge portions, the block rigidity is not excessively reduced, and abrasion resistance on dry road surfaces is assured.

Figure 6A:
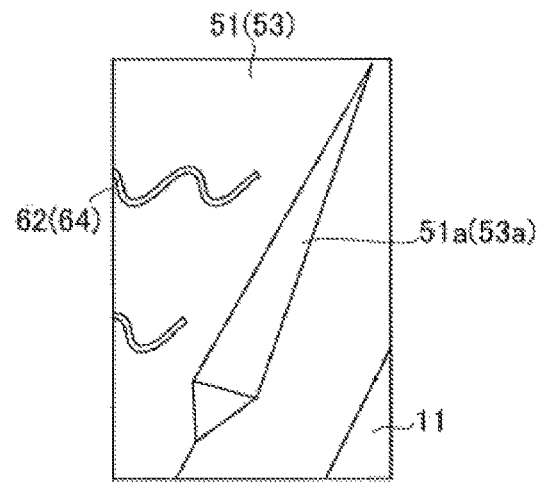
FIG. 6A is a view of an enlargement of a region A illustrated in FIG. 4.
Figure 6B:
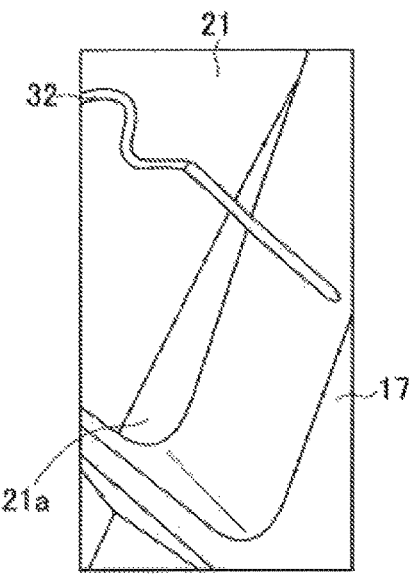
FIG. 6B is a view of an enlargement of a region B illustrated in FIG. 4.

The chamfers 21*a* are provided on both sides in the tire width direction of each of the land portion blocks 22 as illustrated in FIG. 6B, and the chamfers 21*a* are each machined so that a chamfer depth thereof is greater toward both sides in the tire circumferential direction. FIG. 6B is an enlarged view of a region encircled by B in FIG. 4 for explaining the chamfer 21*a*. The depth of the chamfer 21*a* is preferably 50% or less, more preferably from 10% to 30% of the groove depth of the inner circumferential main grooves 15, 17 from the point of view of abrasion resistance.

Figure 6C:
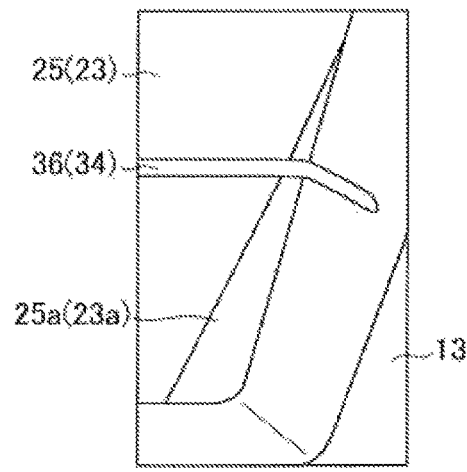
FIG. 6C is a view of an enlargement of a region C illustrated in FIG. 4.

As illustrated in FIG. 4, chamfers 23*a* are provided on some of the edge portions of the intermediate land portion 23 in contact with the outer circumferential main groove 11. Furthermore, chamfers 25*a* are provided on some of the edge portions of the intermediate land portion 25 in contact with the outer circumferential main groove 13. In such a configuration, edge amounts of the intermediate land portions 23, 25 are increased, and wet turning performance and steering stability on snow are improved. Furthermore, since the chamfers 23*a*, 25*a* are provided on some of the edge portions, the block rigidity is not excessively reduced and abrasion resistance on dry road surfaces is assured. FIG. 6C is an enlarged view of a region encircled by C in FIG. 4 for explaining the chamfer 25*a*. Note that the reference numerals represented in parentheses in FIG. 6C are for indicating the elements in the region of the intermediate land portion 23 for ease of description. The chamfers 23*a* may be provided on the edge portions of the intermediate land portion 23 in contact with the inner circumferential main groove 15. Furthermore, the chamfers 25*a* may be provided on the edge portions of the intermediate land portion 25 in contact with the inner circumferential main groove 17. The depth of the chamfers 23*a*, 25*a* is preferably 50% or less, and more preferably from 10% to 30% of the groove depth of the circumferential main grooves 11, 13, 15, 17 from the point of view of abrasion resistance.

As illustrated in FIG. 4, chamfers 51*a*, 53*a* are respectively provided on some of the edge portions in contact with the outer circumferential main grooves 11, 13 of the shoulder land portions 51, 53. As a result, edge amounts of the shoulder land portions 51, 53 are increased, and wet turning performance and steering stability on snow are improved. Furthermore, the chamfers 51*a*, 53*a* are provided so as to assure abrasion resistance on dry road surfaces without excessively reducing the rigidity of the shoulder land portions 51, 53. The chamfers 51*a*, 53*a* each have two surfaces adjacent to each other in the tire circumferential direction and having different inclinations as illustrated in FIG. 4 and FIG. 6A. FIG. 6A is an enlarged view of a region encircled by A in FIG. 4 for explaining the chamfer 51*a*. Note that the reference numerals represented in parentheses in FIG. 6A are for indicating the elements in the region of the shoulder land portion 53 for ease of description. The depth of the chamfers 51*a*, 53*a* is preferably 50% or less, and more preferably from 10% to 30% of the groove depth of the outer circumferential main grooves 11, 13.

The groove depths of the circumferential main grooves 11, 13, 15, 17 may be the same as each other or different.

The maximum depths of the chamfers 21*a*, 23*a*, 25*a*, 51*a*, 53*a* may be the same as each other or different.

The groove depths of the circumferential shallow grooves 41, 43 may be the same as each other or different.

The maximum widths of the land portion blocks 24, 26 may be the same as each other or different.

The sipes 34, 36 may not be arranged parallel to the lug grooves 33, 35. The sipes 34, 36 may be respectively connected with the outer circumferential main grooves 11, 13. Furthermore, the sipes 34, 36 may be respectively blocked within the intermediate land portions 23, 25 without connecting with the inner circumferential main grooves 15, 17. The tread pattern 10 may not have the sipes 34, 36.

The sipes 34, 36 may be provided only on one side of the circumferential shallow grooves 41, 43.

The shoulder lug grooves 61, 63 may be respectively connected with the outer circumferential main grooves 11, 13, thereby forming a plurality of land portion blocks in the tire circumferential direction. The tread pattern 10 may not have the shoulder lug grooves 61, 63.

The groove width of the shoulder lug grooves 61, 63 may be equal to or less than the groove width of the lug grooves 31, 33, 35.

The number of circumferential main grooves is not limited to four and may be five or more. In this case, three inner circumferential main grooves can be provided.

The tread pattern 10 in the above pneumatic tire 1 has the four circumferential main grooves 11, 13, 15, 17 and the lug grooves 31 and the sipes 32 in the region of the center land portion 21, and further has the lug grooves 33, 35 and the sipes 34, 36 in the regions of the intermediate land portions 23, 25, whereby the basic wet turning performance and the steering stability on snow required for tire performance are assured.

Furthermore, the lug grooves 33, 35 provided in the respective intermediate land portions 23, 25 are inclined in the same orientation with respect to directions (X1 direction and X2 direction) different from each other of the tire circumferential direction, and the lug grooves 33, 35 are inclined in an opposite orientation with respect to the tire circumferential direction of the lug grooves 31 provided in the region of the center land portion 21, and moreover, the lug grooves 33, 35 are bent so that the groove inclination approaches the tire circumferential direction (X1 direction, X2 direction) at the points P, Q where the lug grooves 33, 35 respectively intersect the circumferential shallow grooves 41, 43, whereby wet turning performance and steering stability on snow are improved.

Furthermore, when the configuration of the shoulder lug grooves 61, 63 is added to the configuration of the lug grooves 31, 33, 35, the tread pattern 10 has grooves with various orientations and inclination angles, whereby wet turning performance and steering stability on snow are further improved.

Furthermore, the regions of the intermediate land portions 23, 25 are respectively provided with the circumferential shallow grooves 41, 43 having a groove depth less than the groove depth of the circumferential main grooves 11, 13, 15, 17, whereby abrasion resistance is assured.

The sipes 34, 36 are provided respectively in the regions of the intermediate land portions 23, 25 and are blocked within the intermediate land portions 23, 25 without connecting with the inner circumferential main grooves 15, 17, whereby abrasion resistance on dry road surfaces is assured.

The sipes 34, 36 have the three-dimensional shape in the regions on the inner side of the circumferential shallow grooves 41, 43 in the tire width direction, whereby block rigidity during braking and driving is improved.

The formation of the continuous land portions extending continuously in the tire circumferential direction in the regions of the shoulder land portions 51, 53 allows a high block rigidity of the shoulder land portions 51, 53 to be assured and allows abrasion resistance on dry road surfaces to be improved. Furthermore, a reduction in block rigidity of the shoulder land portions 51, 53 is prevented and abrasion resistance on dry road surfaces is assured.

The maximum groove width of the shoulder lug grooves 61, 63 is greater than the groove width of the lug grooves 31, 33, 35, whereby wet turning performance and steering stability on snow are improved.

Chamfers are provided on some of the edge portions in the tire width direction of the center land portion 21 and the intermediate land portions 23, 25, whereby the edge amounts are increased, and wet turning performance and steering stability on snow are improved.

(Other Forms of Tread Pattern)

Figure 7:
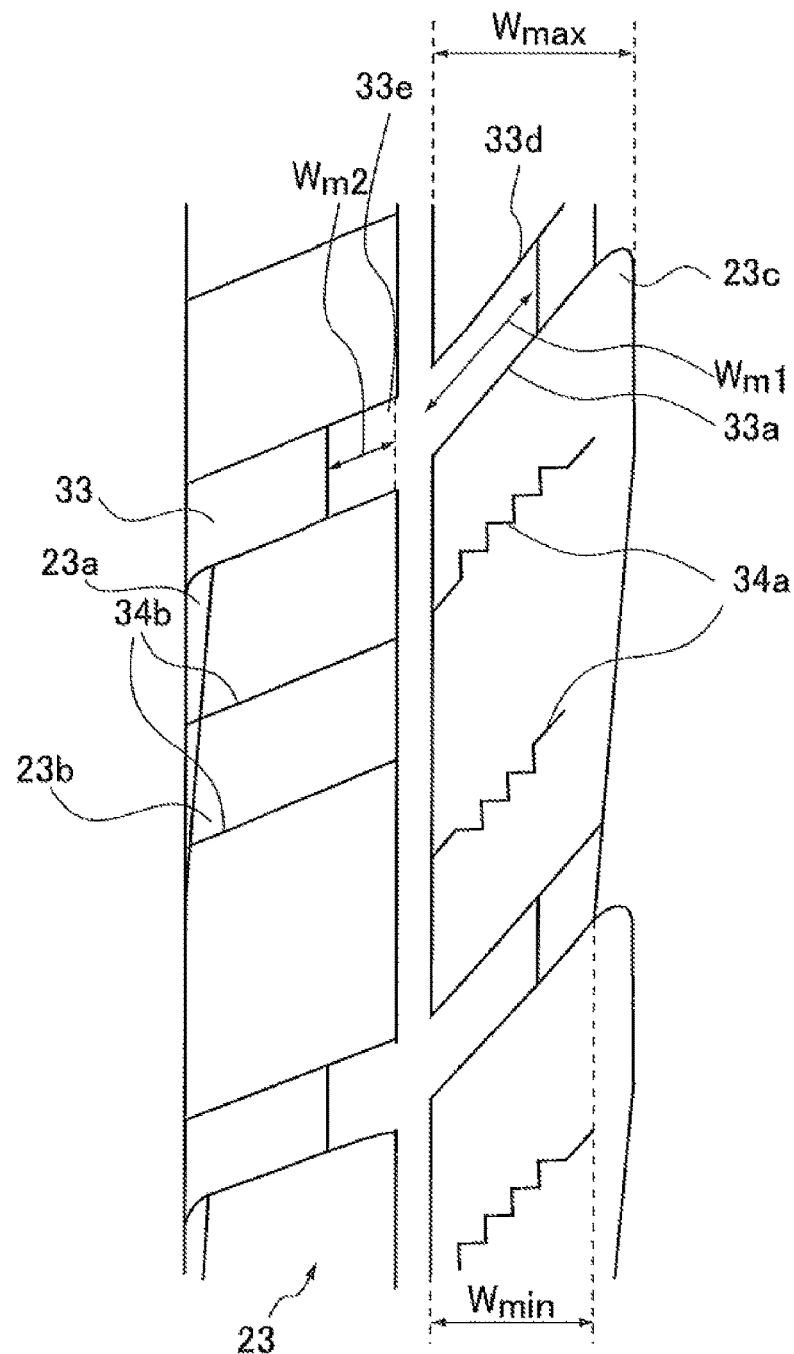
FIG. 7 is a view of an enlargement of an intermediate land portion of another embodiment.

The tread pattern 10 may further include the following preferable forms. FIG. 7 is an enlarged view of the intermediate land portion 23 of the intermediate land portions 23, 25 discussed below. The intermediate land portion 25 has the same configuration.

The circumferential shallow grooves 41, 43 (see FIG. 3) divide the intermediate land portions 23, 25 into inside intermediate land portions 23i, 25i and outside intermediate land portions 23o, 25o, and divide the land portion blocks 24, 26 of the intermediate land portions 23, 25 into the inside intermediate land portion blocks 24a, 26a positioned on the inner side in the tire width direction and outside intermediate land portion blocks 24b, 26b positioned on the outer side in the tire width direction (see FIG. 3).

Conversely, the lug grooves 33, 35 are bent at the portions where the lug grooves 33, 35 intersect the circumferential shallow grooves 41, 43, and the inclination direction of the lug grooves 33, 35 on the inner side of the bent portions in the tire width direction approaches the tire circumferential direction more than on the outer side in the tire width direction. Specifically, the inclination direction of the lug grooves 33 approaches the X1 direction and the inclination direction of the lug grooves 35 approaches the X2 direction. As a result, the inside intermediate land portion blocks 24a, 26a are provided with corner portions having the most acute angle among the corner portions of the land portion blocks 24, 26. Therefore, if no sipes are provided in the land portion blocks 24, 26, the block rigidity of the inside intermediate land portion blocks 24a, 26a provided with the aforementioned most acute angle corner portions is lower than the block rigidity of the outside intermediate land portion blocks 24b, 26b. As a result, the lug grooves 33, 35 are preferably provided with below-mentioned raised bottom portions or sipe shapes.

(Raised Bottom Portions)

The groove depth of the circumferential shallow grooves 41, 43 is shallower than the groove depth of the lug grooves 33, 35 as described above. As a result, groove bottoms of the lug grooves 33, 35 in intersecting peripheral regions that include portions where the lug grooves 33, 35 intersect the circumferential shallow grooves 41, 43 form raised bottom portions having a groove depth less than groove bottoms of regions spaced away from the intersecting peripheral regions. The example illustrated in FIG. 7 illustrates a raised bottom portion 33a of the lug groove 33. A length along the lug grooves 33 of portions of the raised bottom portions of the lug grooves 33 that extend from the intersecting portions to the inner side in the tire width direction is longer than a length along the lug grooves 33 of portions of the raised bottom portions that extend from the intersecting portions to the outer side in the tire width direction. In the example of the lug groove 33 illustrated in FIG. 7, a length $W_{m1}$ along the lug grooves 33 of a portion 33d of the raised bottom portion 33a of the lug groove 33 that extends from an intersecting portion to the inner side in the tire width direction is longer than a length $W_{m2}$ along the lug grooves 33 of a portion 33e that extends from the intersecting portion to the outer side in the tire width direction.

In this way, on the length of the raised bottom portions on the groove bottoms of the lug grooves 33, 35, the length of the portions of the raised bottom portions on the inner side of the intersecting portions in the tire width direction is made longer than the length of the portions of the raised bottom portions on the outer side of the intersecting portions in the tire width direction, thereby allowing the block rigidity of the inside intermediate land portion blocks 24a, 26a that is reduced due to the provision of the most acute angle corner portions among the corner portions of the land portion blocks 24, 26 to approach the block rigidity of the outside intermediate land portion blocks 24b, 26b. As a result, abrasion resistance is at least maintained, and wet turning performance and steering stability on snow can be improved.

(Other Forms of Sipes)

As described above, while the inside sipes 34a, 36a are three-dimensional shape sipes and the outside sipes 34b, 36b are two-dimensional shape sipes among the sipes 34, 36, the inside sipes 34a, 36a are not limited to being three-dimensional shape sipes. The form of the inside sipes 34a, 36a can be defined according to the form of the outside sipes 34b, 36b so that the block rigidity of the inside intermediate land portion blocks 24a, 26a that is reduced by having the acute angle corner portions 23c, 25c (the tips of the corner portions 23c, 25c appear round in FIG. 7) at least approaches the block rigidity of the outside intermediate land portion blocks 24b, 26b.

An form A is exemplified as one form of a combination of the inside sipes 34a, 36a and the outside sipes 34b, 36b, in which the inside sipes 34a, 36a satisfy extending in a zigzag manner (wave-like manner) from the tread surface to the tread inside portion or extending in the direction inclined with respect to the tire radial direction, and extending in a wave-like manner on the tread surface, whereas the outside sipes 34b, 36b satisfy at least one of extending in a linear manner in the tire radial direction from the tread surface to the tread inside portion and extending in a linear manner on the tread surface.

Furthermore, an form B is exemplified as another form of a combination of the inside sipes 34a, 36a and the outside sipes 34b, 36b, in which the inside sipes 34a, 36a satisfy extending in a linear manner in the tire radial direction from the tread surface to the tread inside portion and extending in a zigzag manner (wave-like manner) on the tread surface, and the outside sipes 34b, 36b satisfy extending in a linear manner in the tire radial direction from the tread surface to the tread inside portion and extending in a linear manner on the tread surface.

Figure 8:
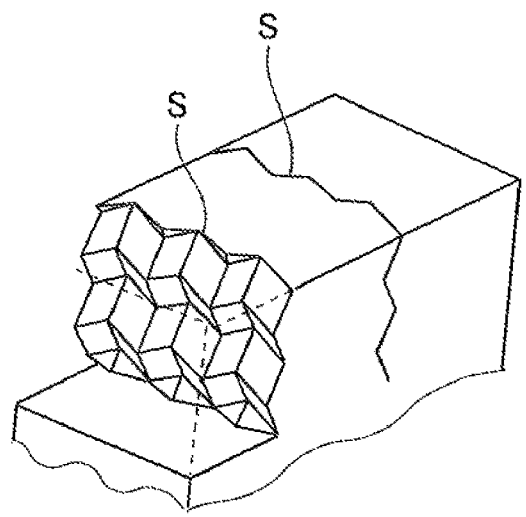
FIG. 8 is a view for explaining an example of a sipe provided in the intermediate land portion illustrated in FIG. 7.
Figure 9:
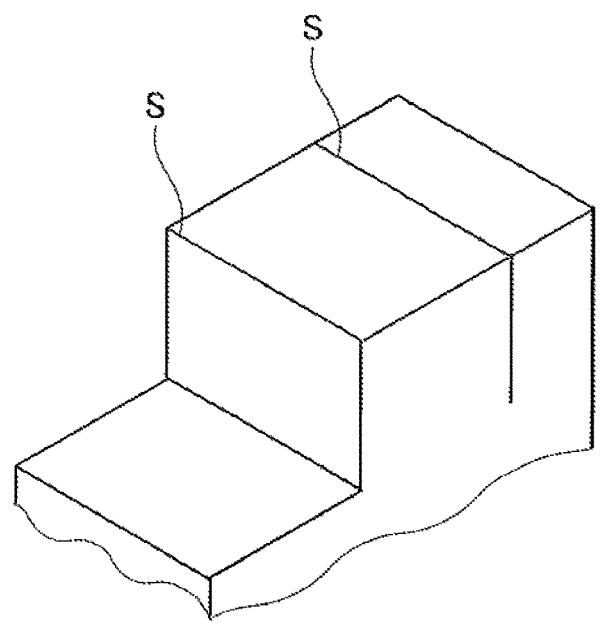
FIG. 9 is a view for explaining another example of a sipe provided in the intermediate land portion illustrated in FIG. 7.

FIGS. 8 to 11 are views illustrating examples of types of sipes S. A sipe S illustrated in FIG. 8 is a three-dimensional shape sipe that extends in a zigzag manner (wave-like manner) from the tread surface to the tread inside portion and extends in a zigzag manner (wave-like manner) on the tread surface. A sipe S illustrated in FIG. 9 is a two-dimensional shape sipe that extends in a linear manner in the tire radial direction from the tread surface to the tread inside portion and extends in a linear manner on the tread surface.

Figure 10:
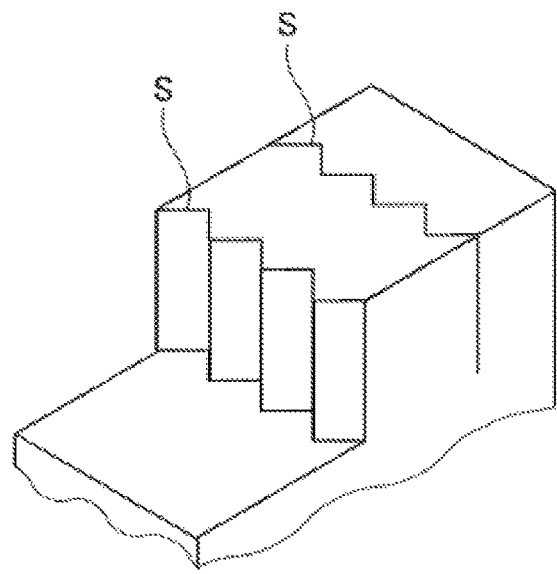
FIG. 10 is a view for explaining another example of a sipe provided in the intermediate land portion illustrated in FIG. 7.

A sipe S illustrated in FIG. 10 is a sipe that extends in a linear manner in the tire radial direction from the tread surface to the tread inside portion and extends in a zigzag manner (wave-like manner) on the tread surface. A sipe S illustrated in FIG. 11 is a three-dimensional shape sipe that extends in a direction inclined with respect to the tire radial direction from the tread surface to the tread inside portion and extends in a zigzag manner (wave-like manner) on the tread surface.

The opposing wall surfaces in the tread inside portion of the sipes come into contact with each other and become closed so that the interval of the sipes is eliminated due to the force received from the road surface during braking, driving, or turning of the tire. During the contact, resistance to the force received from the road surface is generated so that the portions of the tread rubber divided by the sipes act as if not divided when the sipes become closed if surface unevenness is formed on the wall surfaces so that the wall surfaces mesh with each other, and thus a high block rigidity is demonstrated. The same can be said of sipes formed in a zigzag manner (wave-like manner) on the tread surface. Therefore, the order of the degree of suppression of a reduction in block rigidity due to the sipes among the sipes illustrated in FIGS. 8 to 11 is the sipe S illustrated in FIG. 8 and the sipe S illustrated in FIG. 11, and then the sipe S illustrated in FIG. 10, and lastly the sipe S illustrated in FIG. 9.

Figure 11:
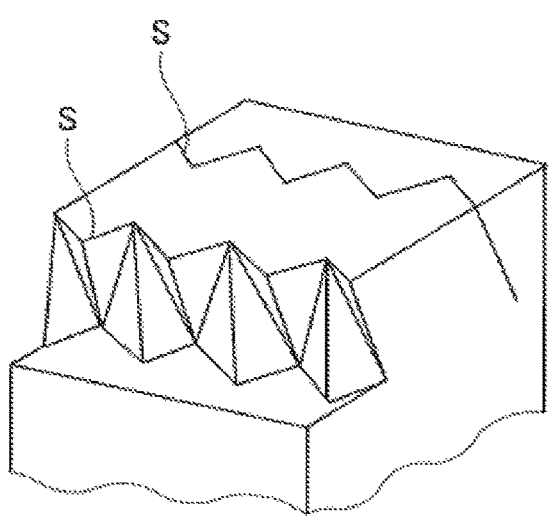
FIG. 11 is a view for explaining another example of a sipe provided in the intermediate land portion illustrated in FIG. 7.

Therefore, the form A of the above-mentioned combination may use, for example, the sipe S illustrated in FIG. 8 or 11 for the inside sipes 34a, 36a, and may use the sipe S illustrated in FIG. 9 or 10 for the outside sipes 34b, 36b.

The form B of the above-mentioned combination may use, for example, the sipe S illustrated in FIG. 10 for the inside sipes 34a, 36a, and may use the sipe S illustrated in FIG. 9 for the outside sipes 34b, 36b.

Accordingly, by adopting the sipe shape that is able to suppress a reduction in block rigidity for the inside sipes 34a, 36a further than the sipe shape of the outside sipes 34b, 36b, a balance between the block rigidities of the inside intermediate land portion blocks 24a, 26a and the outside intermediate land portion blocks 24b, 26b is optimized. As a result, abrasion resistance is at least maintained, and wet turning performance and steering stability on snow can be improved.

(Test 1)

Test tires were manufactured to study the effects of the tread pattern 10 of the tire 1 of the present technology.

The tire size was P265/70R17 113T. Tires with a rim size of 17×7.5J were manufactured provided with the tread patterns according to the specifications described in the following Tables 1 and 2. A front-engine, front-drive (FF) vehicle with an engine displacement of 2 liters was used as a test vehicle for studying tire performance. The inner pressure of all of the front wheels and the rear wheels was set to 230 kPa.

Wet turning performance, steering stability on snow, and abrasion resistance were evaluated for tire performance of the test tires as described below.

The test vehicle was driven for 5 laps at a limited speed on an R30 (radius 30 m) turning course of a wet road surface of an outdoor tire testing facility having a film of water with a depth of 1 mm in, and the average lateral acceleration at this time was measured for evaluating the wet turning performance. The evaluation was performed by expressing the measured values as an index and taking the inverse of the measured value of the tire of the Conventional Example 1 as 100. A larger index signifies a correspondingly superior wet turning performance.

For the steering stability on snow, the road surface was changed from a wet road surface having a film of water with a depth of 1 mm to a snow-covered road surface, and the tires were evaluated based on sensory evaluations by the driver. The evaluation results were expressed as indexes, the tire of the Conventional Example 1 being assigned an index of 100. A larger index signifies a correspondingly superior steering stability on snow.

The abrasion resistance was evaluated by measuring the amount of abrasion after the test vehicle was driven for 2000 km on public roads. The evaluation was carried out by taking the inverse of the measurement values and expressing the inverse of the measurement values of the tire of the Conventional Example 1 as 100. A larger index signifies a correspondingly superior abrasion resistance.

The respective evaluation results and specifications of the tires are described in Tables 1 and 2.

Note that "not parallel" signifies that the direction in which the sipes extend is in the opposite orientation with respect to the tire width direction to the direction in which the lug grooves extend inside the region of the same intermediate land portion, and "parallel" signifies that the direction in which the sipes extend is in the same orientation with respect to the tire width direction as the direction in which the lug grooves extend inside the region of the same intermediate land portion, in Tables 1 and 2. Furthermore, the groove depth of the circumferential shallow grooves signifies a percentage (%) with respect to the groove depth of the circumferential main grooves. Whether the shoulder lug grooves are blocked or not indicates that the shoulder lug grooves 61, 63 are blocked part way through without connecting with the outer circumferential main grooves 11, 13, or indicates that the shoulder lug grooves 61, 63 are connected with the outer circumferential main grooves 11, 13. The sipes in the intermediate land portions all had the two-dimensional shape in the third embodiment. The evaluation of the Conventional Example 1 was expressed as an index of 100 in Tables 1 and 2. The evaluation of the Conventional Example 2 was expressed as an index of 100 in Tables 3 to 6.

The percentages of the lengths Wm1, Wm2 of the raised bottom portions illustrated in FIG. 7 with respect to the maximum width of the lug grooves 33, 35 in the tire width direction in the region of intermediate land portions 23, 25 were both 15% in the Working Examples 1 to 5 and the Comparative Examples 1 to 3. The inside sipes 34a, 36a were the three-dimensional shape sipes illustrated in FIG. 8, and the outside sipes 34b, 36b were the two-dimensional shape sipes illustrated in FIG. 9. The below-mentioned "circumferential shallow groove position (%)" was 35%, and the "shoulder lug groove width" was 5 mm in Working Examples 1 to 5. Furthermore, the below-mentioned "rate of change (%) of the width of the inside intermediate land portion blocks" was 0% in the Working Examples 1 to 5 and in the Comparative Examples 1 to 3. That is, the inside intermediate land portion block width did not change.

TABLE 1

|  | Conventional Example 1 | Working Example 1 | Working Example 2 | Working Example 3 | Working Example 4 |
|---|---|---|---|---|---|
| Presence or absence of lug grooves in center land portion, inclination angle of lug grooves, maximum groove width thereof | Absent | Present 70° 5 mm | Present 70° 5 mm | Present 70° 5 mm | Present 70° 5 mm |
| Presence or absence of bends in lug grooves in intermediate land portions, inclination angle of lug grooves, maximum groove width thereof | No Bend 70° 5 mm | Bend 70° 45° 5 mm | Bend 70° 45° 5 mm | Bend 70° 45° 5 mm | Bend 70° 45° 5 mm |
| Presence or absence of circumferential shallow grooves, groove depth thereof | Absent | Present 30% | Present 30% | Present 30% | Present 30% |
| Sipes in intermediate land portion (parallel, not parallel) | Not parallel | Parallel | Not parallel | Parallel | Parallel |
| Presence or absence of sipes with three-dimensional shape in intermediate land portions | Absent | Present | Present | Absent | Present |
| Inclination angle of shoulder lug grooves, maximum groove width thereof | 70° 5 mm | 85° 5 mm | 85° 5 mm | 85° 5 mm | 85° 5 mm |
| Presence or absence of blocking in shoulder lug grooves | Absent | Present | Present | Present | Absent |
| Presence or absence of chamfers in land portions | Absent | Present | Present | Present | Present |
| Steering stability on snow | 100 | 104 | 104 | 106 | 106 |
| Wet turning performance | 100 | 104 | 104 | 106 | 106 |
| Abrasion resistance | 100 | 104 | 103 | 100 | 101 |

TABLE 2

|  | Working Example 5 | Comparative Example 1 | Comparative Example 2 | Comparative Example 3 |
|---|---|---|---|---|
| Presence or absence of lug grooves in center land portion, inclination angle of lug grooves, maximum groove width thereof | Present 70° 5 mm | Present 70° 5 mm | Present 70° 5 mm | Present 70° 5 mm |
| Presence or absence of bends in lug grooves in intermediate land portions, inclination angle of lug grooves, maximum groove width thereof | Bend 70° 45° 5 mm | Bend 70° 45° 5 mm | Bend 70° 45° 5 mm | No Bend 70° 5 mm |
| Presence or absence of circumferential shallow grooves, groove depth thereof | Present 30% | Absent | Present 100% | Present 60% |
| Sipes in intermediate land portions (parallel, not parallel) | Parallel | Parallel | Parallel | Parallel |
| Presence or absence of sipes with three-dimensional shape in intermediate land portions | Present | Present | Present | Present |
| Inclination angle of shoulder lug grooves, maximum groove width thereof | 85° 5 mm | 85° 5 mm | 85° 5 mm | 85° 5 mm |
| Presence or absence of blocking in shoulder lug grooves | Present | Present | Present | Present |
| Presence or absence of chamfers in land portions | Absent | Present | Present | Present |
| Steering stability on snow | 102 | 101 | 105 | 102 |
| Wet turning performance | 102 | 101 | 105 | 102 |
| Abrasion resistance | 107 | 100 | 95 | 95 |

As can be seen in Table 1 and Table 2, when the lug grooves were bent in the region of the intermediate land portions and the groove depth of the circumferential shallow grooves was less than the groove depth of the circumferential main grooves (Working Examples 1 to 5), the balance between abrasion resistance on dry road surfaces, and wet turning performance and steering stability on snow was more superior than when the above was not true (Comparative Examples 1 to 3). That is, abrasion resistance on dry road surfaces was maintained (index of 100 or more), and wet turning performance and steering stability on snow were superior (index of 102 or more).

In particular, the tires of the Working Examples 1 to 5 in which the groove depth of the circumferential shallow grooves was 30% of the groove depth of the circumferential main grooves demonstrated a balance between steering stability on snow, wet turning performance, and abrasion resistance more superior than that of the tire of the Comparative Example 2 in which the lug grooves were bent in the region of the intermediate land portions while the groove depth of the circumferential shallow grooves was the same (100%) as the groove depth of the circumferential main grooves.

(Test 2)

In addition, in order to study the effects of the tread pattern 10 of the tire 1 of the present technology, test tires were manufactured, and the effects were confirmed. The tire size and the tire performance were the same as in Test 1, and the testing details for the evaluations were also the same as in Test 1. Tire performance was evaluated in Test 2 with an index based on the Conventional Example 2 having the specifications shown in Table 3.

Tables 3 and 4 include, in addition to the items in Tables 1 and 2, the items of "shape of inside sipes in intermediate land portions", "shape of outside sipes in intermediate land portions", and "raised bottom portion lengths Wm1 (%): Wm2 (%)". The "shape of inside sipes in intermediate land portions" and "shape of outside sipes in intermediate land portions" indicate the shapes of the inside sipes 34a, 36a and the outside sipes 34b, 36b. The "raised bottom portion lengths Wm1(%):Wm2 (%)" indicates percentages of ratios of the lengths Wm1 and Wm2 of the raised bottom portions illustrated in FIG. 7 with respect to the maximum width in the tire width direction of the lug grooves 33, 35 in the regions of the intermediate land portions 23, 25.

Tables 5 and 6 include, in addition to the items in Tables 3 and 4, "rate of change (%) of inside intermediate land portion block width", "circumferential shallow groove position (%)", and "shoulder lug groove width". The "rate of change (%) of inside intermediate land portion block width" indicates a percentage $(w_{max}-w_{min})/w_{max}$ derived from the maximum width $w_{max}$ and the minimum width $w_{min}$ of the inside intermediate land portion blocks illustrated in FIG. 7. The "circumferential shallow groove position (%)" indicates a percentage of a ratio of the distance in the tire width direction from the edges of the inside intermediate land portions 23i, 25i that come into contact with the inner circumferential main grooves 15, 17 to the center positions of the circumferential shallow grooves 41, 43 with respect to the maximum width in the tire width direction of the intermediate land portions 23, 25. This percentage being greater than 50% indicates that the center positions of the circumferential shallow grooves 41, 43 are positioned on the outer side in the tire width direction of the center in the tire width direction of the intermediate land portions 23, 25.

The "circumferential shallow groove position (%)" was 35% and the "shoulder lug groove width" was 5 mm in the Working Examples 6 to 12. Furthermore, the "rate of change (%) of inside intermediate land portion block width" was 0% in Working Examples 6 to 12. That is, the inside intermediate land portion block width did not change.

TABLE 3

|  | Conventional Example 2 | Working Example 6 | Working Example 7 | Working Example 8 |
|---|---|---|---|---|
| Presence or absence of lug grooves in center land portion, inclination angle of lug grooves, maximum groove width thereof | Absent | Present 60° 5 mm | Present 60° 5 mm | Present 60° 5 mm |
| Presence or absence of bends in lug grooves in intermediate land portions, inclination angle of lug grooves, maximum groove width thereof | Bend 60° 45° 5 mm | Bend 60° 45° 5 mm | Bend 60° 45° 5 mm | Bend 60° 45° 5 mm |
| Presence or absence of circumferential shallow grooves, groove depth thereof | Absent | Present 30% | Present 30% | Present 30% |
| Sipes in intermediate land portions (parallel, not parallel) | Not parallel | Parallel | Parallel | Parallel |
| Shape of inside sipes in intermediate land portions | FIG. 9 | FIG. 8 | FIG. 8 | FIG. 8 |
| Shape of outside sipes in intermediate land portions | FIG. 9 | FIG. 9 | Wave-like shape in sipe depth direction, linear shape on surface | FIG. 10 |
| Raised bottom portion lengths Wm1(%):Wm2(%) | — | 25%:15% | 25%:15% | 25%:15% |
| Inclination angle of shoulder lug grooves, maximum groove width thereof | 85° 5 mm | 85° 5 mm | 85° 5 mm | 85° 5 mm |
| Presence or absence of blocking in shoulder lug grooves | Absent | Present | Present | Present |
| Presence or absence of chamfers in land portions | Absent | Present | Present | Present |
| Steering performance on snow | 100 | 105 | 103 | 104 |
| Wet turning performance | 100 | 105 | 103 | 104 |
| Abrasion resistance | 100 | 104 | 103 | 102 |

TABLE 4

|  | Working Example 9 | Working Example 10 | Working Example 11 | Working Example 12 |
|---|---|---|---|---|
| Presence or absence of lug grooves in center land portion, inclination angle of lug grooves, maximum groove width thereof | Present 60° 5 mm | Present 60° 5 mm | Present 60° 5 mm | Present 60° 5 mm |
| Presence or absence of bends in lug grooves in intermediate land portions, inclination angle of lug grooves, maximum groove width thereof | Bend 60° 45° 5 mm | Bend 60° 45° 5 mm | Bend 60° 45° 5 mm | Bend 60° 45° 5 mm |

TABLE 4-continued

|  | Working Example 9 | Working Example 10 | Working Example 11 | Working Example 12 |
|---|---|---|---|---|
| Presence or absence of circumferential shallow grooves, groove depth thereof | Present 30% | Present 30% | Present 30% | Present 30% |
| Sipes in intermediate land portions (parallel, not parallel) | Parallel | Parallel | Parallel | Parallel |
| Shape of inside sipes in intermediate land portions | Wave-like shape in sipe depth direction, linear shape on surface | FIG. 10 | FIG. 9 | FIG. 8 |
| Shape of outside sipes in intermediate land portions | Wave-like shape in sipe depth direction, linear shape on surface | FIG. 9 | FIG. 9 | FIG. 8 |
| Raised bottom portion lengths Wm1 (%):Wm2 (%) | 25%:15% | 25%:15% | 25%:15% | 25%:15% |
| Inclination angle of shoulder lug grooves, maximum groove width thereof | 85° 5 mm | 85° 5 mm | 85° 5 mm | 85° 5 mm |
| Presence or absence of blocking in shoulder lug grooves | Present | Present | Present | Present |
| Presence or absence of chamfers in land portions | Present | Present | Present | Present |
| Steering performance on snow | 102 | 103 | 102 | 105 |
| Wet turning performance | 102 | 103 | 102 | 104 |
| Abrasion resistance | 101 | 102 | 101 | 101 |

TABLE 5

|  | Working Example 13 | Working Example 14 | Working Example 15 | Working Example 16 |
|---|---|---|---|---|
| Presence or absence of lug grooves in center land portion, inclination angle of lug grooves, maximum groove width thereof | Present 60° 5 mm | Present 60° 5 mm | Present 60° 5 mm | Present 60° 5 mm |
| Presence or absence of bends in lug grooves in intermediate land portions, inclination angle of lug grooves, maximum groove width thereof | Bend 60° 45° 5 mm | Bend 60° 45° 5 mm | Bend 60° 45° 5 mm | Bend 60° 45° 5 mm |
| Rate of change (%) of inside intermediate land portion block width | 12% | 12% | 12% | 12% |
| Presence or absence of circumferential shallow grooves, groove depth thereof | Present 30% | Present 30% | Present 30% | Present 30% |
| Circumferential shallow groove position (%) | 35% (inside) | 35% (inside) | 35% (inside) | 55% (outside) |
| Sipes in intermediate land portions (parallel, not parallel) | Parallel | Parallel | Parallel | Parallel |

TABLE 5-continued

|  | Working Example 13 | Working Example 14 | Working Example 15 | Working Example 16 |
|---|---|---|---|---|
| Shape of inside sipes in intermediate land portions | FIG. 8 | FIG. 8 | FIG. 8 | FIG. 8 |
| Shape of outside sipes in intermediate land portions | FIG. 9 | FIG. 9 | FIG. 9 | FIG. 9 |
| Raised bottom portion lengths Wm1 (%):Wm2 (%) | 25%:15% | 25%:25% | 25%:35% | 25%:15% |
| Inclination angle of shoulder lug grooves, maximum groove width thereof | 85° 5 mm | 85° 5 mm | 85° 5 mm | 85° 5 mm |
| Presence or absence of blocking in shoulder lug grooves | Present | Present | Present | Present |
| Groove width of shoulder lug grooves | 5 mm | 5 mm | 5 mm | 5 mm |
| Presence or absence of chamfers in land portions | Present | Present | Present | Present |
| Steering performance on snow | 105 | 105 | 105 | 105 |
| Wet turning performance | 105 | 105 | 105 | 105 |
| Abrasion resistance | 105 | 103 | 102 | 106 |

TABLE 6

|  | Working Example 17 | Working Example 18 | Working Example 19 |
|---|---|---|---|
| Presence or absence of lug grooves in center land portion, inclination angle of lug grooves, maximum groove width thereof | Present 60° 5 mm | Present 60° 5 mm | Present 60° 5 mm |
| Presence or absence of bends in lug grooves in intermediate land portions, inclination angle of lug grooves, maximum groove width thereof | Bend 60° 45° 5 mm | Bend 60° 45° 5 mm | Bend 60 45° 5 mm |
| Rate of change (%) of inside intermediate land portion block width | 12% | 12% | 12% |
| Presence or absence of circumferential shallow grooves, groove depth thereof | Present 30% | Present 30% | Present 30% |
| Circumferential shallow groove position (%) | 55% (outside) | 35% (inside) | 35% (inside) |
| Sipes in intermediate land portions (parallel, not parallel) | Parallel | Parallel | Parallel |
| Shape of inside sipes in intermediate land portions | FIG. 8 | FIG. 8 | FIG. 8 |
| Shape of outside sipes in intermediate land portions | FIG. 9 | FIG. 9 | FIG. 9 |
| Raised bottom portion lengths Wm1 (%):Wm2 (%) | 25%:15% | 25%:15% | 25%:15% |

TABLE 6-continued

|  | Working Example 17 | Working Example 18 | Working Example 19 |
|---|---|---|---|
| Inclination angle of shoulder lug grooves, maximum groove width thereof | 85° 5 mm | 85° 5 mm | 85° 5 mm |
| Presence or absence of blocking in shoulder lug grooves | Present | Present | Absent |
| Groove width of shoulder lug grooves | 5 mm | 6 mm | 5 mm |
| Presence or absence of chamfers in land portions | Absent | Present | Present |
| Steering performance on snow | 104 | 105 | 105 |
| Wet turning performance | 104 | 105 | 105 |
| Abrasion resistance | 105 | 106 | 104 |

As can be seen from Table 3, the inside sipes 34a, 36a preferably satisfy extending in a zigzag manner (wave-like manner) from the tread surface to the tread inside portion and extending in a zigzag manner (wave-like manner) on the tread surface, and the outside sipes 34b, 36b preferably satisfy at least one of extending in a linear manner in the tire radial direction from the tread surface to the tread inside portion and extending in a linear manner on the tread surface, or the inside sipes 34a, 36a preferably satisfy extending in a linear manner in the tire radial direction from the tread surface to the tread inside portion and extending in a zigzag manner (wave-like manner) on the tread surface, and the outside sipes 34b, 36b preferably satisfy extending in a linear manner in the tire radial direction from the tread surface to the tread inside portion and extending in a linear manner on the tread surface.

Furthermore, as can be seen in Table 4, the inside sipes 34a, 36a preferably satisfy extending in a linear manner from the tread surface to the tread inside portion and extending in a zigzag manner (wave-like manner) on the tread surface, and the outside sipes 34b, 36b preferably satisfy extending in a linear manner in the tire radial direction from the tread surface to the tread inside portion and extending in a linear manner on the tread surface.

It can be seen from Table 5 that the length Wm1 of the raised bottom portion of the lug grooves 33, 35 is preferably longer than the length Wm2.

It can be seen from the Working Example 13 in Table 5 and from the Working Example 6 in Table 3 that the width in the tire width direction of the inside intermediate land portion blocks 24a, 26a is preferably greater toward the acute angle corner portions in the tire circumferential direction.

It can be seen from the Working Example 13 in Table 5 and from the Working Example 16 in Table 6 that the center positions in the tire width direction of the circumferential shallow grooves 41, 43 is preferably fixed at positions spaced away from the edges of the inner circumferential main grooves 15, 17 in contact with the inside intermediate land portions 23i, 25i by a distance that is from 40% to 60% of the maximum width in the tire width direction of the intermediate land portions 23, 25.

It can be seen from the Working Example 16 and 17 in Tables 5-6 that the chamfers 23a, 25a are preferably provided on the outside intermediate land portion blocks 24b, 26.

It can be seen from the Working Example 13 in Table 5 and from the Working Example 18 in Table 6 that the groove width of the shoulder lug grooves 61, 63 is preferably greater than the maximum groove width of the lug grooves 31, 33, 35.

It can be seen from a comparison between the Working Example 13 in Table 5 and the Working Example 19 in Table 6 that blocking the shoulder lug grooves 61, 63 without connecting the shoulder lug grooves 61, 63 with the outer circumferential main grooves is preferable from the point of view of abrasion resistance on dry road surfaces, wet turning performance, and steering stability on snow.

The pneumatic tire of the present technology was described in detail above. However, it should be understood that the present technology is not limited to the above embodiments, but may be improved or modified in various ways so long as these improvements or modifications remain within the scope of the present technology.

What is claimed is:

1. A pneumatic tire, comprising:
a bead;
a side wall;
a belt layer;
a carcass layer; and
a tread portion having a tread pattern;
the tread pattern including:
a circumferential main groove group having four circumferential main grooves extending parallel to a tire circumferential direction, the four circumferential main grooves including two outer circumferential main grooves and two inner circumferential main grooves interposed by the outer circumferential main grooves with a tire center line passing between the inner circumferential main grooves;
a plurality of lug grooves transecting a region of a center land portion, partitioned by the two inner circumferential main grooves and having the tire center line passing therethrough, and regions of two intermediate land portions partitioned by the outer circumferential main grooves and the inner circumferential main grooves, to form a plurality of land portion blocks in the center land portion and in the intermediate land portions; and
circumferential shallow grooves provided in respective regions of the intermediate land portions, the circumferential shallow grooves extending in the tire circumferential direction and having a groove depth less than a groove depth of the circumferential main grooves;
an orientation of a groove inclination inclined with respect to a first direction of the tire circumferential direction of first lug grooves provided in a region of a first intermediate land portion of the two intermediate land portions and advancing from an outer side in a tire width direction to an inner side in the tire width direction, being identical to an orientation of a groove inclination inclined with respect to a second direction opposite to the first direction of the tire circumferential direction of second lug grooves provided in a region of a second intermediate land portion different from the first intermediate land portion of the two intermediate land portions and advancing from the outer side in the tire width direction to the inner side in the tire width direction, and the lug grooves provided in respective regions of the intermediate land portions having bent portions, the bent portions being bent so that the groove inclination approaches the tire circumferential direction at positions of intersection with the circumferential shallow grooves; and lug grooves provided in the center land portion and advancing from the outer side in the tire width direction to the inner side in the tire width direction extending in an orientation of a groove inclination different with respect to the tire circumferential direction from the lug grooves provided in the respective regions of the intermediate land portions; wherein first sipes are provided in a region of the first intermediate land portion, the first sipes extending in the first direction on both sides of one of the circumferential shallow grooves while advancing from the outer side to the inner side in the tire width direction in the first intermediate land portion, an orientation of inclination of the first sipes that are inclined with respect to the first direction being identical to the orientation of the groove inclination inclined with respect to the first direction of the first lug grooves provided in the region of the first intermediate land portion, second sipes are provided in a region of the second intermediate land portion, the second sipes extending in the second direction on both sides of one of the circumferential shallow grooves while advancing from the outer side to the inner side in the tire width direction in the second intermediate land portion, an orientation of inclination of the second sipes that are inclined with respect to the second direction being identical to the orientation of the groove inclination inclined with respect to the second direction of the second lug grooves provided in the region of the second intermediate land portion, and the first sipes and the second sipes are blocked within the intermediate land portions without connecting with the inner circumferential main grooves on the inner side of the circumferential shallow grooves.

2. The pneumatic tire according to claim 1, wherein the first sipes and the second sipes extend so as to be parallel to the lug grooves provided in the respective regions of the intermediate land portions.

3. The pneumatic tire according to claim 1, wherein each of the first sipes and the second sipes include, in the region on the inner side of one of the circumferential shallow grooves in the tire width direction, a portion that extends in a zigzag manner while deflecting in a direction orthogonal to an extension direction of each of the first sipes and the second sipes, and that extends in a zigzag manner in a sipe depth direction of each of the first sipes and the second sipes from a tread surface toward a bottom portion of each of the first sipes and the second sipes.

4. The pneumatic tire according to claim 3, wherein each of the first sipes and the second sipes include, in the region on the outer side of one of the circumferential shallow grooves in the tire width direction, a portion that extends in a linear manner, and that extends in a planar manner in a depth direction of each of the first sipes and the second sipes from a tread surface toward a bottom portion of each of the first sipes and the second sipes.

5. The pneumatic tire according to claim 1, further comprising shoulder land portions provided in regions on the outer side of the circumferential main groove group in the tire width direction;

regions of the shoulder land portions having shoulder lug grooves provided therein, extending from the outer side in the tire width direction toward the outer circumferential main grooves, the shoulder lug grooves being blocked part way through without connecting with the outer circumferential main grooves, whereby the shoulder land portions forming continuous land portions extending continuously in the tire circumferential direction.

6. The pneumatic tire according to claim 1, further comprising shoulder land portions provided in regions on the outer side of the circumferential main groove group in the tire width direction;

regions of the shoulder land portions having shoulder lug grooves provided therein, extending from the outer side in the tire width direction toward the outer circumferential main grooves;

a maximum groove width of the shoulder lug grooves being greater than a maximum groove width of the lug grooves provided in the region of the center land portion and in the regions of the first and the second intermediate land portions.

7. The pneumatic tire according to claim 6, wherein the regions of the shoulder land portions have shoulder sipes provided therein, extending from the outer side in the tire width direction toward the outer circumferential main grooves, and the shoulder sipes include a first portion extending in a linear manner in an extension direction of the shoulder sipes and extending in a planar manner in a sipe depth direction of the shoulder sipes from a tread surface toward a bottom portion of the shoulder sipes, and a second portion extending in a zigzag manner while deflecting in a direction orthogonal to the extension direction of the shoulder sipes and extending in a zigzag manner in a sipe depth direction of the shoulder sipes from the tread surface toward the bottom portion of the shoulder sipes, and the shoulder sipes change from the first portion to the second portion while advancing from the outer side in the tire width direction toward the outer circumferential main grooves and then end.

8. The pneumatic tire according to claim 1, wherein portions of edge portions coming into contact with the circumferential main grooves in the center land portion and the first and the second intermediate land portions are provided with a chamfer.

9. The pneumatic tire according to claim 1, wherein a width of a land portion in the region on the inner side of one of the circumferential shallow grooves in the tire width direction is greater than a width of a land portion in the region on the outer side of one of the circumferential shallow grooves in the tire width direction in the first and the second intermediate land portions.

10. The pneumatic tire according to claim 1, wherein an inclination angle with respect to the first direction of the first sipes in the region on the inner side of one of the circumferential shallow grooves in the first intermediate land portion is smaller than the inclination angle with respect to the first direction of the first sipes in a region on the outer side of one of the circumferential shallow grooves in the first intermediate land portion, and an inclination angle with respect to the second direction of the second sipes in a region on the inner side of one of the circumferential shallow grooves in the second intermediate land portion is smaller than the inclination angle with respect to the second direction of the second sipes in a region on the outer side of one of the circumferential shallow grooves in the second intermediate land portion.

11. The pneumatic tire according to claim 1, wherein a plurality of center sipes are provided in the region of the center land portion, the plurality of the center sipes being connected to both of the two inner circumferential main grooves, and being inclined to the tire circumferential direction and extending in parallel to the lug grooves provided in the center land portion.

\* \* \* \* \*